United States Patent [19]
Takada et al.

[11] Patent Number: 5,347,444
[45] Date of Patent: Sep. 13, 1994

[54] OUTPUT CIRCUIT OF PWM INVERTER

[75] Inventors: Kazuyuki Takada, Hirakata; Toru Kishi, Yamatokoriyama, both of Japan

[73] Assignee: Matsushita Electric Industrial Co., Ltd., Kadoma, Japan

[21] Appl. No.: 143,504

[22] Filed: Oct. 29, 1993

[30] Foreign Application Priority Data

Oct. 30, 1992 [JP] Japan ................. 4-292472
Oct. 30, 1992 [JP] Japan ................. 4-292473
Dec. 8, 1992 [JP] Japan ................. 4-327769

[51] Int. Cl.$^5$ ............................... H02M 5/44
[52] U.S. Cl. ................... 363/98; 363/41; 363/132
[58] Field of Search ............ 363/41, 98, 132; 323/315

[56] References Cited

U.S. PATENT DOCUMENTS 4,777,579 10/1988 Jahns et al. ............. 363/98
4,934,822  6/1990 Higaki .................. 363/98 X
5,063,338 11/1991 Capel et al. ............ 363/98 X

FOREIGN PATENT DOCUMENTS 57-42589  3/1982 Japan .
59-178980 10/1984 Japan .

Primary Examiner—Steven L. Stephan
Assistant Examiner—Y. Jessica Han
Attorney, Agent, or Firm—Spencer, Frank & Schneider

[57] ABSTRACT

An inexpensive output circuit of a PWM inverter for PWM controlling a coil voltage of a motor with small control error of voltage at a motor winding terminal and low power consumption includes an N channel power MOS-FET, a P channel power MOS-FET, a current control circuit 1 having a current output terminal, and a current control circuit 2 having a current input terminal. A current flowing out from the current output terminal of the current control circuit 1 and a current flowing in from the current input terminal of the current control circuit 2 are subjected to particular control to thereby control the N channel power MOS-FET and the P channel power MOS-FET.

24 Claims, 34 Drawing Sheets

OUTPUT CIRCUIT OF PWM INVERTER

BACKGROUND OF THE INVENTION

The present invention relates to a power circuit of a PWM inverter for PWM controlling a coil voltage of an electric motor.

Recently, a PWM inverter is rapidly spread and is widely utilized to control an electric motor. FIG. 31 is a schematic diagram illustrating a three-phase PWM inverter as an example of a general PWM inverter. In the PWM inverter, generally, the number of output circuits 53 of the PWM inverter is different depending on the number of phases of an electric motor used, while the basic operation thereof is identical.

Referring to FIG. 31, the configuration of the general three-phase PWM inverter will be described.

A basic frequency and an effective voltage value of a three-phase AC voltage waveform supplied to an electric motor 60 are set in frequency and voltage setting means 58. A PWM control circuit 59 generates three-phase PWM signals therein on the basis of the information set in the frequency and voltage setting circuit 58 to output them as switching command signals 42, 61 and 62. The switching command signals 42, 61 and 62 are binary signals for commanding whether winding terminals 52, 63 and 64 of the motor are connected to a positive terminal of a DC main power supply 14 or a negative terminal thereof. A frequency of the switching command signal 42, 61 or 62 is named a PWM carrier frequency and is ten times or more as large as a basic frequency of the three-phase AC voltage waveform. Generally, in many cases, the basic frequency of the three-phase AC voltage waveform supplied to the motor is about 0 to 200 Hz and the PWM carrier frequency is about 2 to 20 kHz. A motor release signal 156 is a binary signal for commanding whether the motor is made to be a free-running state or not. The free-running state is a state in which all of the winding terminals 52, 63 and 64 of the motor are connected to neither the positive terminal nor the negative terminal of the DC main power supply 14, and when any trouble occurs, the motor is set to this state in order to protect the motor and control devices generally. The output circuit 53 of the PWM inverter is a semiconductor switch circuit for controlling to connect the winding terminal 52, 63 or 64 to the positive terminal or the negative terminal of the DC main power supply 14 in accordance with the switching command signal 42, 61 or 62. Further, it is configured so that the winding terminal 52, 63 or 64 of the motor is not connected to either the positive terminal or the negative terminal of the DC main power supply 14 in spite of the switching command signal 42, 61 or 62 when the motor release signal 156 commands the free-running state. In general, a voltage of the DC main power supply is often about DC 140 V obtained by rectifying and smoothing AC 100 V or about DC 280 V obtained by rectifying and smoothing AC 200 V.

A conventional output circuit of the PWM inverter is now described.

FIG. 32 schematically illustrates a conventional output circuit of the PWM inverter.

In FIG. 32, numeral 65 denotes logic inversion means for inverting a logic of the switching command signal 42 to output an inverted switching signal 80. Numerals 157 and 158 denote AND means for taking an AND of the motor release signal 156 and the switching command signal 42 to output the AND signal as an upper arm switching signal 159 and for taking an AND of the motor release signal 156 and the inverted switching signal 80 to output the AND signal as a lower arm switching signal 160, respectively. Numerals 66 and 67 denote on-delay circuits for delaying respective rising edges of the upper arm switching signal 159 and the lower arm switching signal 160 by an on-delay time TD to output an upper arm control signal 81 and a lower arm control signal 82, respectively. Numerals 68 and 69 denote base drive circuits for turning on and off a power transistor 70 in response to the upper arm control signal 81 and a power transistor 71 in response to the lower arm control signal 82, respectively. More particularly, when the upper arm control signal 81 becomes "H" level, an output transistor of a photocoupler 72 is turned on to thereby turn on a transistor 74 with the result that a transistor 76 is turned off to thereby turn on the power transistor 70. On the contrary, when the upper arm control signal 81 becomes "L" level, the output transistor of the photocoupler 72 is turned off to thereby turn off the transistor 74 with the result that the transistor 76 is turned on to thereby turn off the power transistor 70.

As the base drive circuit, there are other base drive circuits described in JUA-57-42589 and JPA-59-178980, while these base drive circuits may function in the same manner as the base drive circuits 68 and 69 shown in FIG. 32 basically and may be employed.

Operation of the output circuit of the PWM inverter configured above is now described.

First of all, it is assumed that the motor release signal 156 is "L" level, that is, the free-running state is commanded. In this case, it will be understood that the power transistors 70 and 71 are off whether the switching command signal 42 is "L" level or "H" level.

Description is now made to the case where the motor release signal 156 is "H" level, that is, a state that is not the free-running state is commanded.

FIG. 33 shows waveforms of signals in the output circuit of the PWM inverter shown in FIG. 32. When the switching command signal 42 is changed from "L" level to "H" level, the on-delay circuit 66 changes the upper arm control signal 81 from "L" level to "H" level after the delay time TD. When the upper arm control signal 81 becomes "H" level, the power transistor 70 is turned on with a delay time TX1 by the base drive circuit 68 and the power transistor 70 existing until the power transistor 70 is turned on after the upper arm control signal 81 has become "H" level. The delay time TX1 varies in accordance with variation of a temperature of the power transistor 70 and a current flowing through the collector thereof, and also varies due to scattering and a secular change of the power transistor and components constituting the base drive circuit.

Further, when the switching command signal 42 changes from "L" level to "H" level, the inverted switching signal 80 is changed from "H" level to "L" level, so that the on-delay circuit 67 changes the lower arm control signal 82 to "L" level substantially immediately. When the lower arm control signal 82 becomes "L" level, the power transistor 71 is turned off with a delay time TY2 by the base drive circuit 69 and the power transistor 71 existing until the power transistor 71 is turned off after the lower arm control signal 82 has become "L" level. The delay time TY2 varies in accordance with variation of a temperature of the power transistor 71 and a current flowing through the collector thereof, and also varies due to scattering and a secular change of the power transistor and components constituting the base drive circuit.

When the switching command signal 42 changes from "H" level to "L" level, the on-delay circuit 66 changes the upper arm control signal 81 to "L" level substantially immediately and the power transistor 70 is turned off with a delay time TY1 by the base drive circuit 68 and the power transistor 70 existing until the power transistor is turned off after the upper arm control signal 81 has been changed to "L" level.

When the switching command signal 42 is changed from "H" level to "L" level, the inverted switching signal 80 is changed from "L" level to "H" level, so that the on-delay circuit 67 changes the lower arm control signal 82 from "L" level to "H" level after the on-delay time TD. When the lower arm control signal 82 is changed to "H" level, the power transistor 71 is turned on with a delay time TX2 by the base drive circuit 69 and the power transistor 71 existing until the power transistor 71 is turned on after the lower arm control signal 82 has been changed to "H" level.

When the delay time TX1 or TX2 is compared with the delay time TY1 or TY2, there is a tendency that the delay time TY1 or TY2 is longer than the delay time TX1 or TX2 generally. When it is assumed that the shortest value of the delay times TX1 and TX2 is TXW in consideration of the worst condition thereof and the longest value of the delay times TY1 and TY2 is TYW in consideration of the worst condition thereof, the on-delay time TD is usually set to a time equal to a sum of a value obtained by subtracting the TXW from the TYW and a slight margin. Usually, the on-delay time TD is set to about 10 to 50 micro seconds when a bipolar type power transistor is used, set to about 5 to 30 micro seconds when an IGBT is used, or set to about 2 to 10 micro seconds when a power MOS-FET is used. Thus, it is prevented that both of the power transistors 70 and 71 are on simultaneously to thereby short-circuit between the positive terminal and the negative terminal of the DC main power supply 14 when the switching command signal 42 is changed from "H" level to "L" level or from "L" level to the "H" level.

From the foregoing, when attention is paid to the states of the switching command signal 42 and a voltage 51 of the motor winding terminal, since the power transistor 70 is off and the power transistor 71 is on when the switching command signal 42 is fixed to "L" level, the motor winding terminal 52 is connected to the negative terminal of the DC main power supply 14 whereas since the power transistor 70 is on and the power transistor 71 is off when the switching command signal 42 is fixed to "H" level, the motor winding terminal 52 is connected to the positive terminal of the DC main power supply 14.

In the above circuit configuration, however, in the case where the motor release signal 156 is "H" level, that is, a state that is not the free-running state is commanded, when the switching command signal 42 is changed from "L" level to "H" level and from "H" level to "L" level, both of the power transistors 70 and 71 are off during a certain time and this off state of both the power transistors causes a control error in the case where the motor winding terminal 52 is voltage-controlled. There is a problem that the control error causes variation of torque generated and a rotational speed of the motor and increases noise vibration of the motor.

This problem is now described in more detail.

In FIGS. 32 and 33, when the switching command signal 42 is changed from "L" level to "H" level and from "H" level to "L", the power transistor being in the on state is first turned off and thereafter the power transistor being in the off state is turned on. Accordingly, the power transistors 70 and 71 are both in the off state during a certain time. This state is named a floating state and this time is named a floating time TZ. Generally, the floating time TZ is often about a half to two thirds of the on-delay time TD.

In general, the PWM control of the motor is essentially made so that the motor winding terminals are alternately connected to the positive terminal and the negative terminal of the DC main power supply to control an average voltage of the motor winding terminal in accordance with a ratio of a time of connection to the positive terminal and a time of connection to the negative terminal. Accordingly, when the voltage of the DC main power supply 14 is fixed, it is ideal that the average voltage of the motor winding terminal 52 can be controlled uniquely in accordance with a ratio of "H" level and "L" level of the switching command signal 42.

In the conventional output circuit of the PWM inverter, however, the average voltage of the motor winding terminal is varied depending on a direction of a current flowing through the motor winding terminal since the floating state exists. More particularly, when the floating state occurs in the state where a current flows from the motor winding terminal 52 into the output circuit 53 of the PWM inverter, a diode 78 is conductive, so that the motor winding terminal 52 is connected to the positive terminal of the DC main power supply 14. This state is shown by a voltage 51A of the motor winding terminal in FIG. 33. On the contrary, when a current flows from the output circuit 53 of the PWM inverter into the motor winding terminal 52 in the floating state, a diode 79 is conductive, so that the motor winding terminal 52 is connected to the negative terminal of the DC main power supply 14. This state is shown by a voltage 51B of the motor winding terminal in FIG. 33. In the floating state, when no current flows in the motor winding terminal 52, a voltage of the motor winding terminal 52 is determined by an induced voltage generated within the motor 60.

As described above, the switching command signal 42 and the average voltage of the motor winding terminal 52 are not uniquely determined due to the floating state, and accordingly the control error occurs. Usually, since the current flowing through the motor winding terminal 52 is an alternate current and the direction thereof is varied, the control error is also varied correspondingly and the generated torque and the rotational speed of the motor 60 are varied. This problem can be solved by removing the floating state and reducing the floating time to zero, while in the conventional output circuit of the PWM inverter the positive terminal and the negative terminal of the DC main power supply 14 are short-circuited and accordingly it is actually impossible to remove the floating state and reduce the floating time to zero.

Further, electric noise occurs when the power transistors are turned on and off, while the switching speed is often reduced by connecting a condenser between the base and the emitter of the power transistors in an application in which the electric noise is desired to be reduced particularly. However, the delay times TX1, TX2, TY1 and TY2 are greatly scattered by reducing the switching speed, and the floating time should be further increased. Accordingly, the control error is increased and consequently the switching speed can not be reduced much.

There are a conventional output circuit of the PWM inverter in which the power transistors 70 and 71 of FIG. 32 are replaced by power MOS-FET's and another conventional output circuit of the PWM inverter in which the power transistors 70 and 71 of FIG. 32 are replaced by IGBT's, while the operation thereof is quite identical with that of the output circuit of the PWM inverter shown in FIG. 32 and the circuits also have the floating state.

SUMMARY OF THE INVENTION

It is an object of the present invention to solve the above problems and to provide an inexpensive output circuit of a PWM inverter which does not produce the control error by essentially removing the floating state to reduce the floating time to zero and uniquely determining the switching command signal and the average voltage of the motor winding terminal and has a low power consumption.

In order to achieve the object, according to one aspect of the present invention, the output circuit of the PWM inverter comprises:

a first power MOS-FET of N channel type, a second power MOS-FET of P channel type, first, second, third and fourth diodes;

current control means 1 including a current output terminal and for controlling a current flowing out from the current output terminal;

current control means 2 including a current input terminal and for controlling a current flowing in from the current input terminal; and a DC main power supply;

the first power MOS-FET having a drain connected to a cathode of the third diode;

the third diode having an anode connected to a cathode of the first diode and a positive terminal of the DC main power supply;

the second power MOS-FET having a drain connected to an anode of the fourth diode;

the fourth diode having a cathode connected to an anode of the second diode and a negative terminal of the DC main power supply;

the first power MOS-FET having a source connected to an anode of the first diode, a source of the second power MOS-FET and a cathode of the second diode;

the first power MOS-FET having a gate connected to a gate of the second power MOS-FET, the current output terminal of the current control means 1 and the current input terminal of the current control means 2;

a resistor and voltage limit means having a zener phenomenon for positive and negative bidirectional voltages being connected in parallel between the gate and the source of the first or second power MOS-FET;

the current control means 1 and 2 having:

a first state in which a current flowing out from the current output terminal of the current control means 1 is a first current value and a current flowing in from the current input terminal of the current control means 2 is a seventh current value;

a second state in which a current flowing out from the current output terminal of the current control means 1 is a second current value and a current flowing in from the current input terminal of the current control means 2 is an eighth current value;

a third state in which a current flowing out from the current output terminal of the current control means 1 is a fifth current value and a current flowing in from the current input terminal of the current control means 2 is a third current value;

a fourth state in which a current flowing out from the current output terminal of the current control means 1 is a sixth current value and a current flowing in from the current input terminal of the current control means 2 is a fourth current value; and a fifth state in which a current flowing out from the current output terminal of the current control means 1 is a ninth current value and a current flowing in from the current input terminal of the current control means 2 is also the ninth current value;

the first current value being larger than the seventh current value;

the second current value being larger than the eighth current value;

the third current value being larger than the fifth current value;

the fourth current value being larger than the sixth current value;

a difference between the first current value and the seventh current value being larger than a difference between the second current value and the eighth current value;

a difference between the third current value and the fifth current value being larger than a difference between the fourth current value and the sixth current value;

the first state capable of proceeding to only the second and fifth states;

the second state capable of proceeding to only the third and fifth states;

the third state capable of proceeding to only the fourth and fifth states;

the fourth state capable of proceeding to only the first and fifth states; and the fifth state capable of proceeding to at least the first and third states.

With such a configuration, since the first and second power MOS-FET's are not on simultaneously to attain safety and the floating time is reduced to zero essentially, there can be realized the output circuit of the PWM inverter having very small control error and low power consumption.

Accordingly, there can be provided the excellent and inexpensive output circuit of the PWM inverter in which the floating state is essentially removed to reduce the floating time to zero and the switching command signal and the average voltage of the motor winding terminal are determined uniquely, so that the control error is very small and the power consumption is also low. Further, there can be provided the excellent and inexpensive output circuit of the PWM inverter having very small electric noise generated.

DESCRIPTION OF THE PREFERRED EMBODIMENTS

Figure 1:
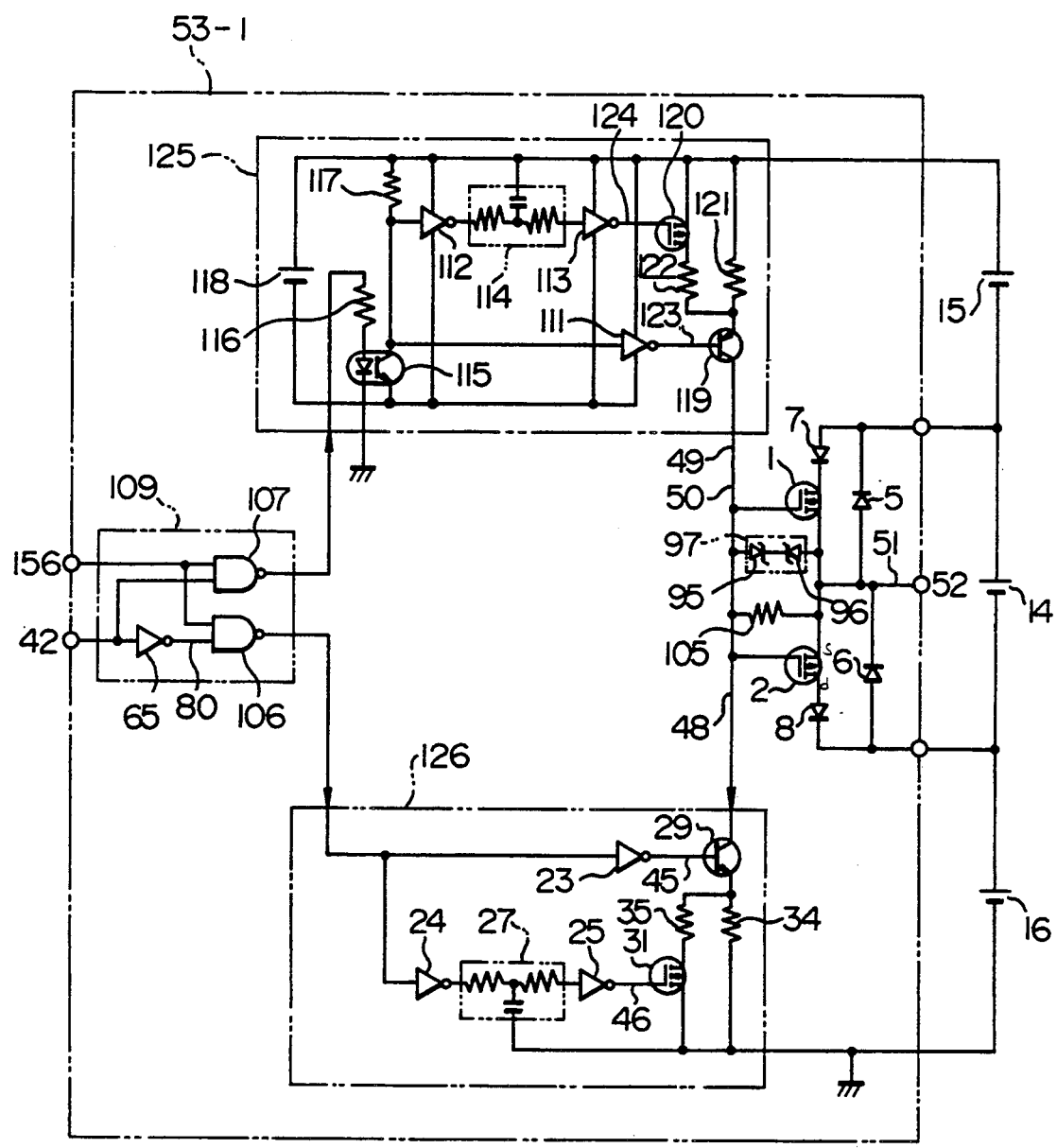
FIG. 1 is a schematic diagram illustrating an output circuit of a PWM inverter according to a first embodiment of the present invention.

Embodiments of the present invention are now described with reference to the accompanying drawings, in which like reference numerals designate like constituent elements.

Embodiment 1

In FIG. 1, numeral 1 denotes a power MOS-FET of N channel type, 2 a power MOS-FET of P channel type, 5, 6, 7 and 8 diodes, 125 and 126 current control means, 109 signal processing circuit means, 14 a DC main power supply, 15 and 16 DC power supplies, 105 a resistor, and 7 voltage limit means including zener diodes 95 and 96.

Operation of the output circuit of the PWM inverter configured above is now described.

Numeral 65 denotes logic inversion means which produces an inverted result of the switching command signal 42 as an inverted switching signal 80.

Numerals 106 and 107 denote NAND means, and the NAND means 106 produces a NAND output of the motor release signal 156 and the inverted switching signal 80 while the NAND means 107 produces a NAND output of the motor release signal 156 and the switching command signal 42.

For the simplification of description, first of all, the following description is made to the case where the motor release signal 156 is "H" level, that is, the state that is not the free-running state is commanded. An additional description is made to the case where the motor release signal 156 is "L" that is, the free-running state is commanded.

Figure 2A:
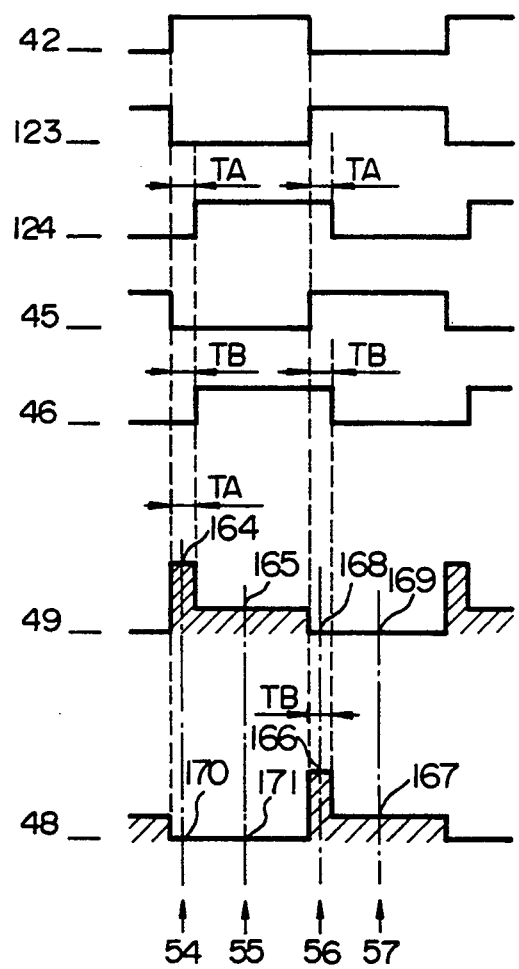
FIG. 2A is a waveform diagram showing operation of current control means of the output circuit of the PWM inverter according to the first embodiment of the present invention.

Referring now to FIG. 2A, operation of the current control means 125 and 126 are described in detail.

The switching command signal 42 is supplied through the NAND means 107, a photocoupler 115 and logic inversion means 111 to a base of a PNP transistor 119 as a base signal 123 thereof. The base signal 123 has, for example, the same potential as that at the positive terminal of the DC power supply 15 when the switching command signal 42 is "L" level and has, for example, the potential which is 5 V lower than that at the positive terminal of the DC power supply 15 when the switching command signal 42 is "H" level.

Further, the switching command signal 42 is supplied through the NAND means 107, the photocoupler 115, logic inversion means 112 and 113 and signal delay means 114 to a P channel MOS-FET 120 as a gate signal 124. The gate signal 124 is a delayed switching command signal 42 by a delay time TA. The "L" level of the gate signal 124 is a voltage by which the MOS-FET 120 can be turned on sufficiently and the "H" level thereof is a voltage by which the MOS-FET 120 can be turned off sufficiently.

The transistor 119 is connected in an emitter follower circuit, and when a potential of the base signal 123 is about 0.7 V or more lower than the potential at the positive terminal of the DC power supply 15, a current determined by a value of a resistor connected to the emitter of the transistor 119 and a voltage applied thereto flows through the transistor 119 as a collector current 49 substantially. When a difference between the potential of the base signal 123 and the potential at the positive terminal of the DC power supply 15 is smaller than about 0.7 V, the collector current 49 is reduced to zero.

The MOS-FET 120 serves to switch the value of the resistor connected to the emitter of the transistor 119. When the MOS-FET 120 is turned on in the case where the potential of the base signal of the transistor 119 is about 0.7 V or more lower than that at the positive terminal of the DC power supply 15, the collector current 49 of the transistor 119 is increased.

The relation between the switching command signal 42 and the collector current 49 is considered. When the switching command signal 42 is "L" level, the collector current 49 is zero, and until the delay time TA elapses after the switching command signal 42 has been changed to "H" level, the collector current 49 has a relatively large current value and then a relatively small current value. When the switching command signal 42 is "L", the collector current 49 is reduced to zero.

Further, the switching command signal 42 is supplied through the logic inversion means 65 and 23 and the NAND means 106 to an NPN transistor 29 as a base signal 45. The base signal 45 is the substantially same as an inverted signal of the switching command signal 42, and the "L" level of the base signal is 0 V while the "H" level thereof is 5 V, for example.

The switching command signal 42 is further supplied to an N channel MOS-FET 31 through the logic inversion means 65, 24 and 25, the NAND means 106 and signal delay means 27 as a gate signal 46.

The gate signal 46 is a delayed switching command signal 42 by a delay time TB. The "L" level of the gate signal 46 is a voltage by which the MOS-FET 31 can be turned off sufficiently and the "H" level thereof is a voltage by which the MOS-FET 31 can be turned on sufficiently.

The transistor 29 is connected in an emitter follower circuit, and when the base signal 45 exceeds about 0.7 V, a collector current 48 determined by a voltage of the base signal 45 and a value of a resistor connected to the emitter of the transistor 29 flows through the transistor 29 while when the base signal 45 is lower than about 0.7 V, the collector current 48 is reduced to zero. The MOS-FET 31 serves to switch the value of the resistor connected to the emitter of the transistor 29, and when the base signal of the transistor 29 exceeds about 0.7 V and the MOS-FET 31 is turned on, the MOS-FET 31 serves to increase the collector current 48 of the transistor 29.

A relation between the switching command signal 42 and the collector current 48 is considered. When the switching command signal 42 is "H" level, the collector current 48 is zero, and until the delay time TB elapses after the switching command signal 42 has been changed to "L" level, the collector current 48 is a relatively large current value and then a relatively small current value. When the switching command signal 42 becomes "H" level, the collector current 48 is reduced to zero.

In brief, it will be understood that the following four states are repeatedly produced in order of the first state to the fourth state in accordance with the switching command signal 42:

a first state in which the collector current 49 has a first current value 164 and the collector current 48 has a seventh current value 170;

a second state in which the collector current 49 has a second current value 165 and the collector current 48 has an eighth current value 171;

a third state in which the collector current 49 has a fifth current value 168 and the collector current 48 has a third current value 166; and a fourth state in which the collector current 49 has a sixth current value 169 and the collector current 48 has a fourth current value 167.

In the embodiment, however, the fifth, sixth, seventh and the eighth current values 168, 169, 170 and 171 are set to zero.

The foregoing is the description for the operation of the current control means 125 and 126.

Operation of the voltage limit means 97 is now described.

The voltage limit means 97 including the zener diodes 95 and 96 serves to limit the upper limit of the collector voltage of the transistor 119 of the current control means 125 so that the transistor 119 is not saturated and at the same time serves to limit the upper limit of the gate voltages of the power MOS-FET's 1 and 2. Further, the voltage limit means 97 including the zener diodes 95 and 96 serves to limit the lower limit of the collector voltage of the transistor 29 of the current control means 126 so that the transistor 29 is not saturated and at the same time serves to limit the lower limit of the gate voltages of the power MOS-FET's 1 and 2.

Although FIG. 1 shows the voltage limit means 97 comprising a pair of zener diodes 95 and 96, more than two zener diodes may be connected in like manner such as connecting their anode or/and cathode in common to each other in series in accordance with a practical design selection. For example, such a voltage limit means may generally comprises two zener diode elements each comprising at least one zener diode connected in series, the two elements being connected in series having respective forward or backward directions of the elements in opposition to each other. Alternatively such a voltage limit means may comprise more than two zener diode means (each comprising at least one zener diode) connected in series and having the respective forward and backward directions connected alternately.

The upper limit of the gate voltages of the power MOS-FET's 1 and 2 is required to be a voltage by which the power MOS-FET 1 can be turned on sufficiently and the power MOS-FET 2 can be turned off sufficiently and which does not exceed the maximum allowable voltage between the gate and the source of the power MOS-FET's 1 and 2. Further, the lower limit of the gate voltage of the power MOS-FET's 1 and 2 is required to be a voltage by which the power MOS-FET 2 can be turned on sufficiently and the power MOS-FET 1 can be turned off sufficiently and which does not exceed the maximum allowable voltage between the gate and the source of the power MOS-FET's 1 and 2.

Generally, the maximum allowable voltage between the gate and the source of an N channel power MOS-FET is often about $\pm 20$ V to $\pm 30$ V and the gate voltage threshold value for starting conduction between the drain and the source is often about $+1$ V to $+5$ V with respect to the source voltage. On the other hand, the maximum allowable voltage between the gate and the source of a P channel power MOS-FET is often about $\pm 20$ V to $\pm 30$ V and the gate voltage threshold value for starting conduction between the drain and the source is often about $-1$ V to $-5$ V with respect to the source voltage.

Figure 3:
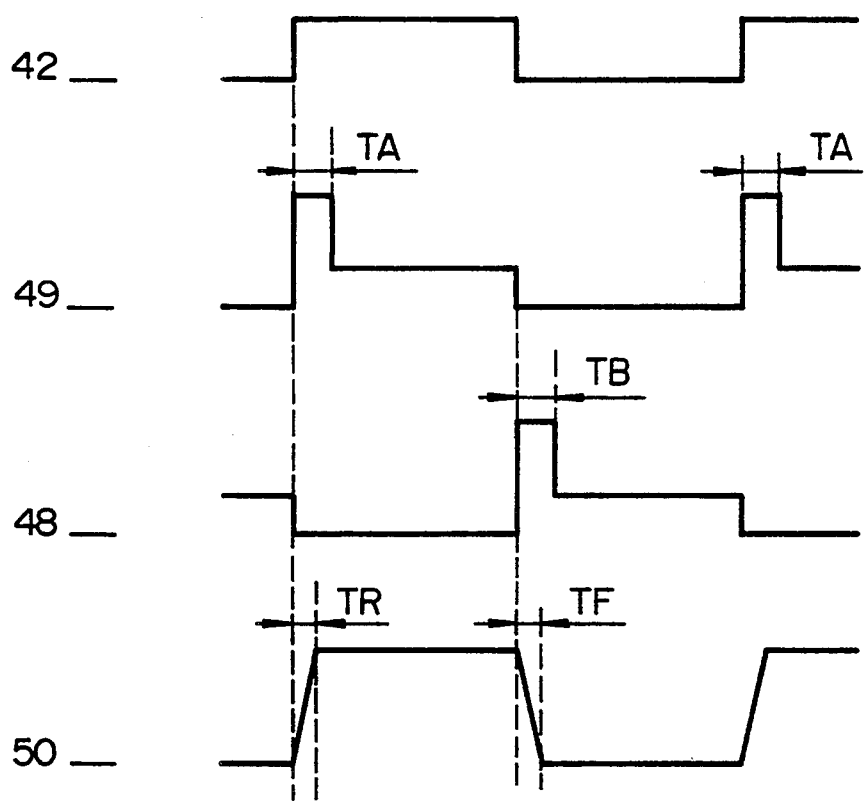
FIG. 3 is a waveform diagram showing operation of the output circuit of the PWM inverter according to the first embodiment of the present invention.

A relation between the switching command signal 42 and a gate voltage signal 50 with respect to the negative terminal of the DC main power supply 14 is shown in FIG. 3. When the switching command signal 42 is first changed from "L" level to "H" level, the collector current 49 of the transistor 119 flows so that the gate signal voltage 50 is rapidly increased and is fixed when the zener diodes 95 and 96 are conductive. The rising time TR required to increase the gate signal voltage 50 is determined by a relation of a capacitance contained in the power MOS-FET's 1 and 2, the zener diodes 95 and 96 and the like and the collector current 49. Since the gate signal voltage 50 is not changed greatly when the zener diodes 95 and 96 are conductive, its voltage can be maintained even if the collector current 49 is a very small current and actually the current is sufficient if it is set to be larger than a value of a current flowing through the resistor 105. Accordingly, by setting the delay time TA of the signal delay means 114 to be slightly longer than the rising time TR, the rising time TR can be made short and electric power loss of the transistor 119 and the resistor 122 can be minimized.

Then, when the switching command signal 42 is changed from "H" level to "L" level, the collector current 48 of the transistor 29 flows so that the gate signal voltage 50 is rapidly reduced and is fixed when the zener diodes 95 and 96 are conductive. The rising time TR required to reduce the gate signal voltage 50 is determined by a relation of a capacitance contained in the power MOS-FET's 1 and 2, the zener diodes 95 and 96 and the like and the collector current 48. Since the gate signal voltage 50 is not changed greatly when the zener diodes 95 and 96 are conductive, its voltage can be maintained even if the collector current 48 is a very small current and actually the current is sufficient if it is set to be larger than a value of a current flowing through the resistor 105. Accordingly, by setting the delay time TB of the signal delay means 27 to be slightly longer than the falling time TF, the rising time TF can be made short and electric power loss of the transistor 29 and the resistor 35 can be minimized.

Operation of the power MOS-FET's 1 and 2 is now described. The power MOS-FET's 1 and 2 include the gates and the source thereof connected in common. Accordingly, when the gate signal voltage 50 is the gate voltage threshold value or more of the power MOS-FET 1 higher than the voltage 51 of the motor winding terminal, the power MOS-FET 1 begins to flow a current from the drain to the source thereof, whereas when the gate signal voltage 50 is the gate voltage threshold value or more of the power MOS-FET 2 lower than the voltage 51 of the motor winding terminal, the power MOS-FET 2 begins to flow a current from the source to the drain thereof. Accordingly, a potential difference between the gate signal voltage 50 and the voltage 51 of the motor winding terminal falls within a predetermined range at all times and it is essentially impossible that the power MOS-FET's 1 and 2 flow currents simultaneously and the positive terminal and the negative terminal of the DC main power supply 14 are short-circuited.

Operation of the diode 5, 6, 7 and 8 is now described. A simplified equivalent circuit of the motor winding is generally expressed by a resistor, an inductance and a voltage source corresponding to an induced voltage connected in series to each other. Accordingly, the direction of a current flowing through the motor winding terminal 52 is not determined uniquely by a voltage applied to the motor winding terminal 52 differently from a pure resistance load, and there are four states including a state A in which the power MOS-FET 1 is on and the power MOS-FET 2 is off so that a current flows from the motor winding terminal 52 to the motor, a state B in which the power MOS-FET 1 is on and the power MOS-FET 2 is off so that a current flows from the motor to the motor winding terminal 52, a state C in which the power MOS-FET 1 is off and the power MOS-FET 2 is on so that a current flows from the motor to the motor winding terminal 52, and a state D in which the power MOS-FET 1 is off and the power MOS-FET 2 is on so that a current flows from the motor winding terminal 52 to the motor. First of all, in the state A, it will be understood that the current flowing through the motor winding terminal 52 flows through the diode 7 and the power MOS-FET 1. In the state C, it will be understood that the current flowing through the motor winding terminal 52 flows through the diode 8 and the power MOS-FET 2. Further, in the states B and D, it will be understood that the currents flowing through the motor winding terminal 52 flows through the diodes 5 and 6, respectively. It will be understood that the voltage 51 of the motor winding terminal in the state B is increased by the current flowing through the motor winding terminal 52 and is fixed when the diode 5 is conductive. Generally, an N channel power MOS-FET includes a parasitic diode which acts to flow a current from the source to the drain and has a defect that a reverse recovery time trr of the parasitic diode is very long. Accordingly, the diode 5 having a short reverse recovery time trr is connected separately and the diode 7 is connected so that a current does not flow through the parasitic diode of the power MOS-FET 1. Since the switching loss is increased if the reverse recovery time trr of the diode 5 is long, it is desirable to select a diode having a short reverse recovery time as the diode 5. Similarly, the voltage 51 of the motor winding terminal in the state D is lowered by the current flowing through the motor winding terminal 52 and is fixed when the diode 6 is conductive. Generally, a P channel power MOS-FET includes a parasitic diode which acts to flow a current from the drain to the source and has a defect that a reverse recovery time trr of the parasitic diode is very long. Accordingly, the diode 6 having a short reverse recovery time trr is connected separately and the diode 8 is connected so that a current does not flow through the parasitic diode of the power MOS-FET 2. Since the switching loss is increased if the reverse recovery time trr of the diode 6 is long, it is desirable to select a diode having a short reverse recovery time as the diode 6.

It is understood from the foregoing description that when the switching command signal 42 is set to be "H" level, the motor winding terminal 52 is connected to the positive terminal of the DC main power supply 14. Further, it is understood that when the switching command signal 42 is set to be "L" level, the motor winding terminal 42 is connected to the negative terminal of the DC main power supply 14, so that the floating time is essentially reduced to zero even when the switching command signal 42 is changed from "H" level to "L" level and from "L" level to "H" level.

Further, there is a merit that the rising time TR and the falling time TF of the gate signal voltage 50 can be set freely within a certain range to thereby also set the rising time and the falling time of the voltage 51 of the motor winding terminal freely within a certain range by changing values of the collector current 49 of the transistor 119 and the collector current 48 of the transistor 29. Usually, it is preferable that the rising time and the falling time of the voltage 51 of the motor winding terminal is as small as possible since electric power loss of the power MOS-FET's 1 and 2 can be reduced, while there is a defect that electric noise is increased. Accordingly, it is necessary to increase the rising time and the falling time of the voltage 51 of the motor winding terminal in an application in which the electric noise is desired to be small particularly, and the above configuration can cope with this easily.

Figure 4:
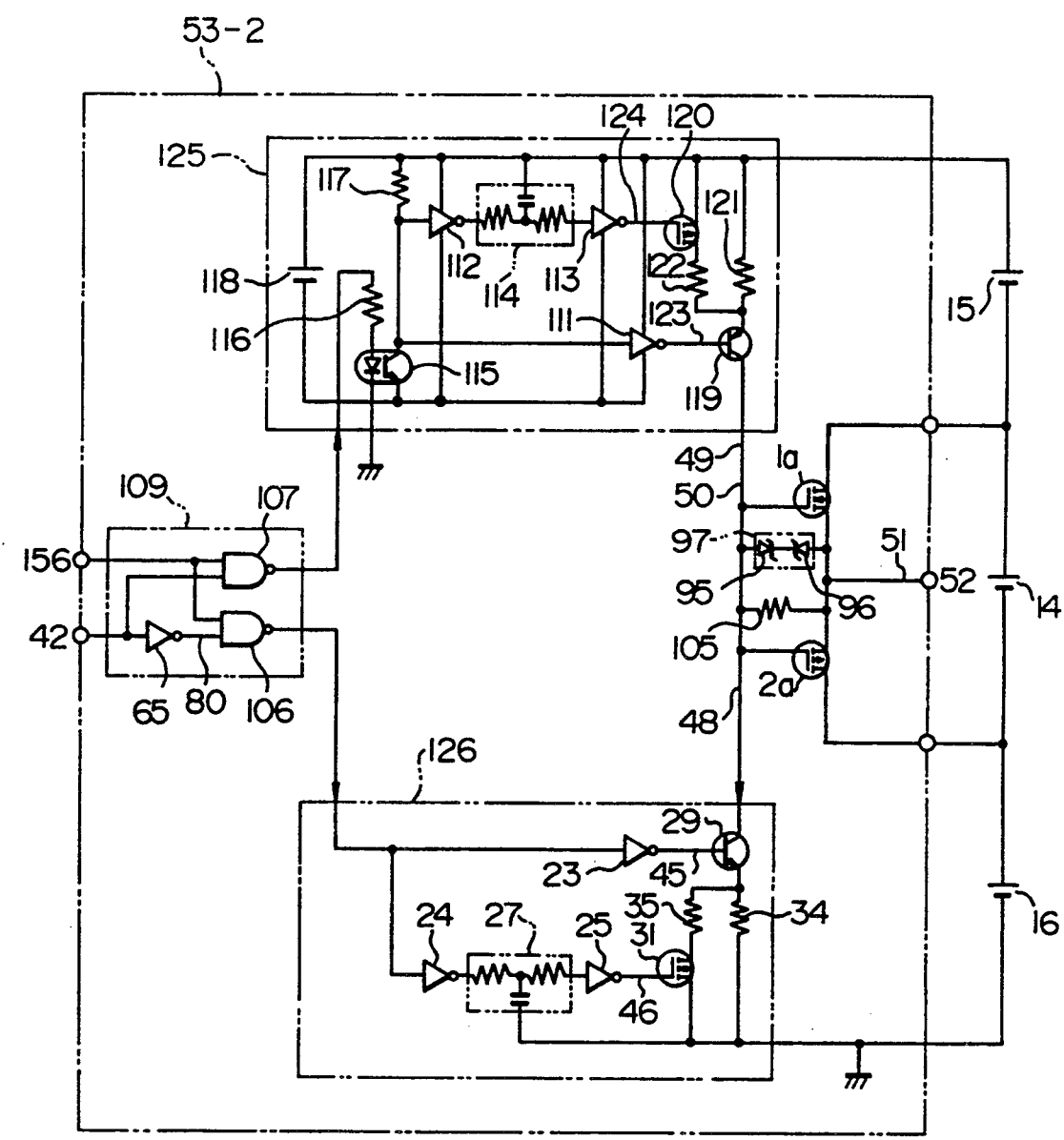
FIG. 4 is a schematic diagram illustrating an output circuit of a PWM inverter according to a second embodiment of the present invention.

It is needless to say that the rising time and the falling time of the voltage 51 of the motor winding terminal can be greatly increased by connecting condensers between the gates and the sources of the power MOS-FET's 1 and 2 in FIGS. 1 and 4.

The operation of the current control circuit means 125 and 126 in the case where the motor release signal 156 is "H" level, that is, the state that is not the free-running state is commanded has been described, while finally operation of the current control means 125 and 126 in the case where the motor release signal 156 is "L" level, that is, the free-running state is commanded will be now described additionally.

When the motor release signal 156 is "L" level, that is, the free-running state is commanded, the output signals of the NAND means 106 and 107 are both "H" level regardless of the switching command signal 42, and accordingly the base signal 123 of the PNP transistor 119 is "H" level and the base signal 45 of the transistor 29 is "L" level.

This state is a so-called fifth state and the collector currents 48 and 49 of a ninth current is both zero.

In the fifth state, the gate signal voltage 50 of the power MOS-FET's 1 and 2 is the substantially same potential as the voltage 51 of the motor winding terminal by means of the resistor 105. Accordingly, the power MOS-FET's 1 and 2 are both off and the free-running state can be attained. The fifth state is used to protect the motor and the control devices by interrupting the operation of the motor mainly in the case of occurrence of any trouble or the like. Movement to the fifth state can be made from any state of the first, second, third and fourth states and is made in an instant that the motor release signal 156 is changed to "L" level. On the contrary, movement from the fifth state to the first or third state is made in an instant that the motor release signal 156 is changed to "H" level. This is a preventive measure because the time required for the rising or falling of the gate signal voltage 50 is very long and the power MOS-FET's 1 and 2 generate excessive heat when the state moves from the fifth state to the second or fourth state. However, movement from the fifth state to other states is made mainly in order to resume the interrupted operation of the motor. The frequency of this operation is low so as to be made about once per several seconds at most and accordingly it can be configured to proceed from the fifth state to all other states if the resistant property of the power MOS-FET's 1 and 2 is sufficient.

In the current control circuit means 125 and 126 of the embodiment, the fifth current value 168, the sixth current value 169, the seventh current value 170 and the eighth current value 171 are set to zero, while it is needless to say that the fifth current value 168, the sixth current value 169, the seventh current value 170 and the eighth current value 171 can be set to be other values than zero if the first current value 164 is set to be larger than the seventh current value 170, the second current value 165 is set to be larger than the eighth current value 171, the third current value 166 is set to be larger than the fifth current value 168, the fourth current value 167 is set to be larger than the sixth current value 169, a difference between the first current value 164 and the seventh current value 170 is set to be larger than a difference between the second current value 165 and the eighth current value 171, and a difference between the third current value 166 and the fifth current value 168 is set to be larger than a difference between the fourth current value 167 and the sixth current value 169.

Figure 2B:
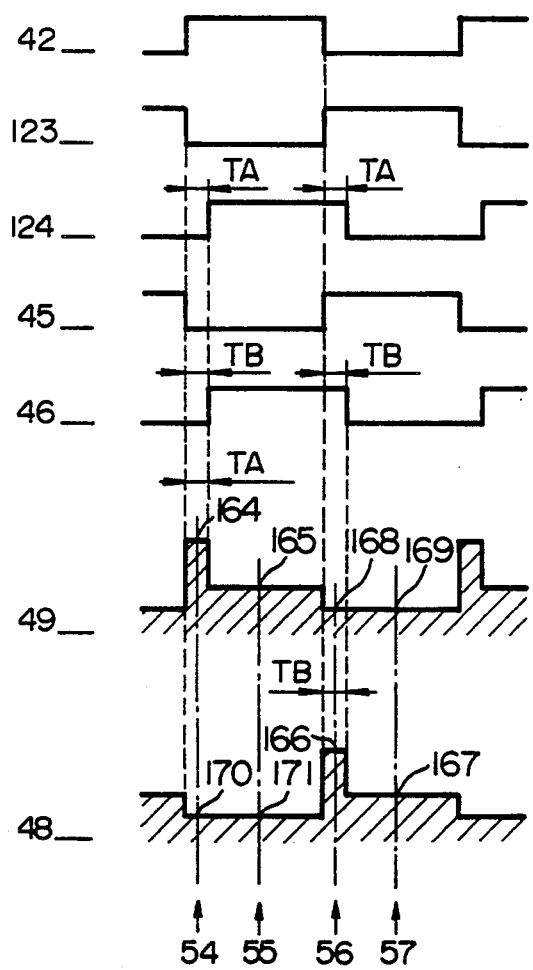
FIG. 2B is a waveform diagram showing another operation of current control means of the output circuit of the PWM inverter according to the first embodiment of the present invention.

FIG. 2B shows an example for the above case.

Further, in the current control circuit means 125 and 126 of the embodiment, the ninth current value in the fifth state is also set to zero, while it is needless to say that the ninth current value can be set to be also other value than zero.

That is, if the collector current 49 of the transistor 119 is set to be the same as the collector current 48 of the transistor 29, the ninth current value can be set to be other value than zero.

Embodiment 2

FIG. 4 schematically illustrates a second embodiment.

In FIG. 4, the current control means 125 and 126, the signal processing circuit means 109, the DC main power supply 14, the DC power supplies 15 and 16, the resistor 105, and the voltage limit means 97 including the zener diodes 95 and 96 are the same as those of FIG. 1. The embodiment of FIG. 4 is different from the embodiment of FIG. 1 in that a power MOS-FET 1a of N channel type and a power MOS-FET 2a of P channel type each including parasitic diode having a short reverse recovery time trr are connected instead of the power MOS-FET's 1 and 2 and the diodes 5, 6, 7 and 8.

Recently, the technique of power MOS-FET's is advanced and the power MOS-FET's including parasitic diodes having a very short reverse recovery time trr are manufactured partially. The circuit configuration of FIG. 5 can be attained by obtaining the power MOS-FET's including the parasitic diodes having the short reverse recovery time trr, and the number of components can be reduced.

Embodiment 3

Figure 5:
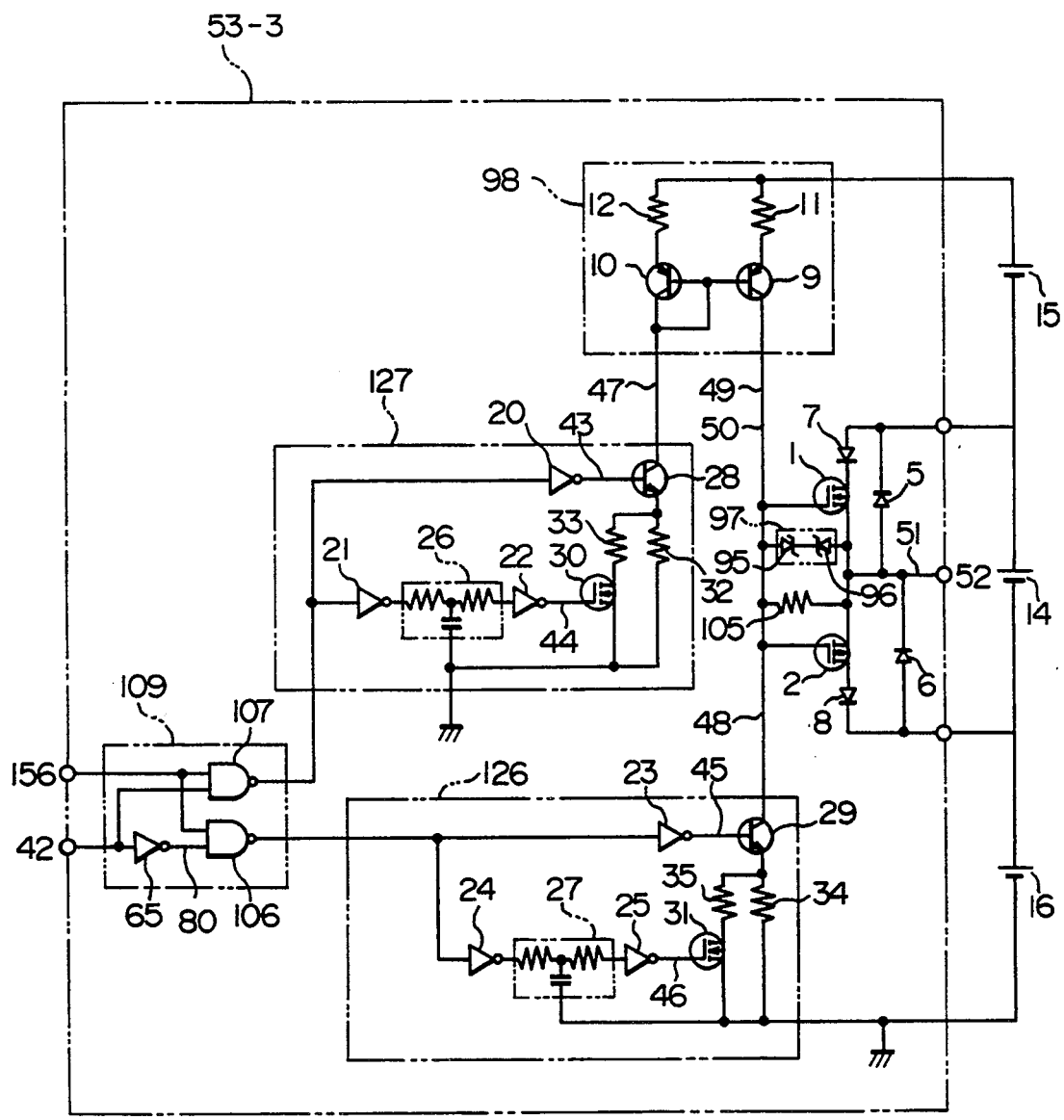
FIG. 5 is a schematic diagram illustrating an output circuit of a PWM inverter according to a third embodiment of the present invention.

FIG. 5 schematically illustrates a third embodiment.

In FIG. 5, the N channel power MOS-FET 1, the P channel power MOS-FET 2, the diodes 5, 6, 7 and 8, the current control circuit means 126, the signal processing means 109, the DC main power supply 14, the DC power supplies 15 and 16, the resistor 105, and the voltage limit means 97 including the zener diodes 95 and 96 are the same as those of FIG. 1.

The embodiment of FIG. 5 is different from the embodiment of FIG. 1 in that current mirror means 98 and current control circuit means 127 are provided instead of the current control means 125.

In the output circuit of the PWM inverter configured above, operation of the current mirror means 98 and the current control means 127 different from the configuration of FIG. 1 is now described.

For the simplification of description, description is made to the case where the motor release signal 156 is "H" level, that is, a state that is not the free-running state is commanded. Finally, description is additionally made to the case the motor release signal 156 is "L" level, that is, the free-running state is commanded.

Figure 6:
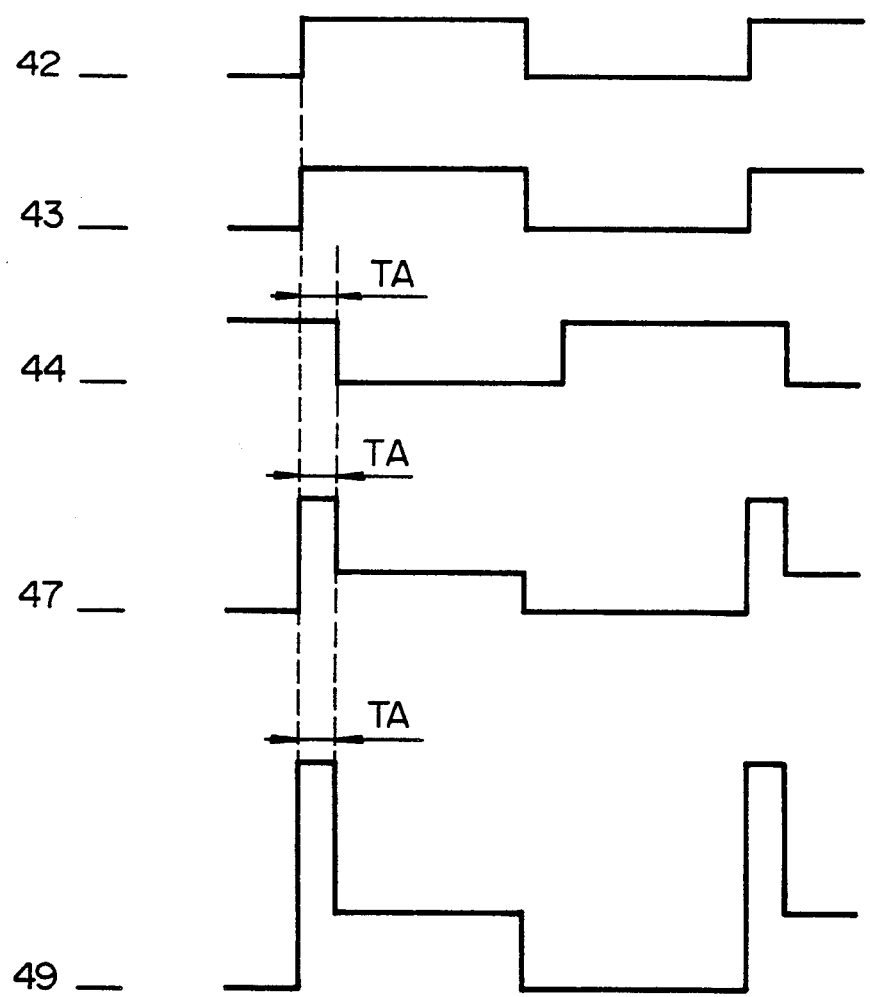
FIG. 6 is a waveform diagram showing operation of current control means of the output circuit of the PWM inverter according to the third embodiment of the present invention.

Referring now to FIG. 6, operation of the current control circuit means 127 is described in detail. The switching command signal 42 is supplied through NAND means 107 and inversion means 20 to the base of an NPN transistor 28 as a base signal 43. The base signal 43 is the substantially same as the switching command signal 42, and the "L" and "H" levels thereof are, for example, 0 V and 5 V, respectively. Further, the switching command signal 42 is supplied through inversion means 21 and 22, the NAND means 107 and signal delay means 26 to the gate of an N channel MOS-FET 30 as a gate signal 44. The gate signal 44 is obtained by delaying an inverted signal of the switching command signal 42 by the delay time TA and "L" and "H" levels thereof are set to be voltages capable of sufficiently turning off and on the MOS-FET 30, respectively. The transistor 28 is configured into the emitter follower circuit. When the base signal 43 exceeds about 0.7 V, a collector current 47 determined by a voltage of the base current 43 and a value of a resistor connected to the emitter of the transistor 28 flows, and when the base signal 43 is smaller than about 0.7 V, the collector current 47 is reduced to zero. The MOS-FET 30 serves to switch the value of the resistor connected to the emitter of the transistor 28, and when the base signal of the transistor 28 exceeds about 0.7 V and the MOS-FET 30 is turned on, the MOS-FET 30 serves to increase the collector current 47 of the transistor 28.

A relation between the switching command signal 42 and the collector current 47 is now considered. When the switching command signal 42 is "L" level, the collector current 47 is zero. Then, until the delay time TA elapses after the switching command signal 42 has been changed to "H" level, the collector current 47 becomes a relatively large current value and is then reduced to a relatively small current value. When the switching command signal 42 is changed to "L" level, the collector current 47 becomes zero.

The foregoing is the description for the operation of the current control means 127.

Operation of the current mirror means 98 is now described.

Resistors 11 and 12 and transistors 9 and 10 are connected into the current mirror configuration, which functions to control a collector current 49 of the transistor 9 to be a current corresponding to or depending upon a collector current 47 of the transistor 28 as far as the transistor 9 is not saturated. When a collector voltage of the transistor 9 is increased excessively and the transistor 9 is saturated to be turned on, a proportional relation between the collector currents 47 and 49 collapses and the next off operation of the transistor 9 is delayed. Accordingly, it is necessary to operate the transistor 9 without saturating the transistor 9. Thus, the voltage limit means 97 including the zener diodes 95 and 96 limits the upper limit of the collector voltage of the transistor 9 so as not to saturate the transistor 9.

A relation between the switching command signal 42 and the collector current 49 of the transistor 9 is now considered. When the switching command signal 42 is "L" level, the collector current 49 is zero and then until the delay time TA elapses after the switching command signal 42 has been changed to "H" level, the collector current 49 becomes a relatively large current value and is then reduced to a relatively small current value. When the switching command signal 42 is changed to "L" level, the collector current 49 becomes zero.

The foregoing is the description for the operation of the current control circuit means 127 and the current mirror means 98 in the case where the motor release signal 156 is "H" level, that is, the state that is not the free-running state is commanded, while finally operation of the current control means 127 and the current mirror means 98 in the case where the motor release signal 156 is "L" level, that is, the free-running state is commanded is now described additionally. When the motor release signal 156 is "L" level, that is, the free-running state is commanded, the output signal of the NAND means 107 is "H" level regardless of the switching command signal 42. Accordingly, the base signal 43 of the NPN transistor 28 is "L" level. In this state, the collector current 47 is zero and the collector current 49 of the transistor 9 is also zero. This is a so-called fifth state.

It is understood from the foregoing that the current mirror means 98 and the current control means 127 perform the same operation as that of the current control means 125.

Although the above current 49 is made to flow in proportion to the current 47, one of output current magnitudes of such a current mirror means may be determined linearly or non linearly in association with the other current magnitude.

In FIGS. 5, 7, 8, 9, 10 and 11, it is needless to say that the rising time and the falling time of the voltage 51 of the motor winding terminal can be greatly increased by connecting condensers between the gates and the sources of the power MOS-FET's 1 and 2.

Embodiment 4

Figure 7:
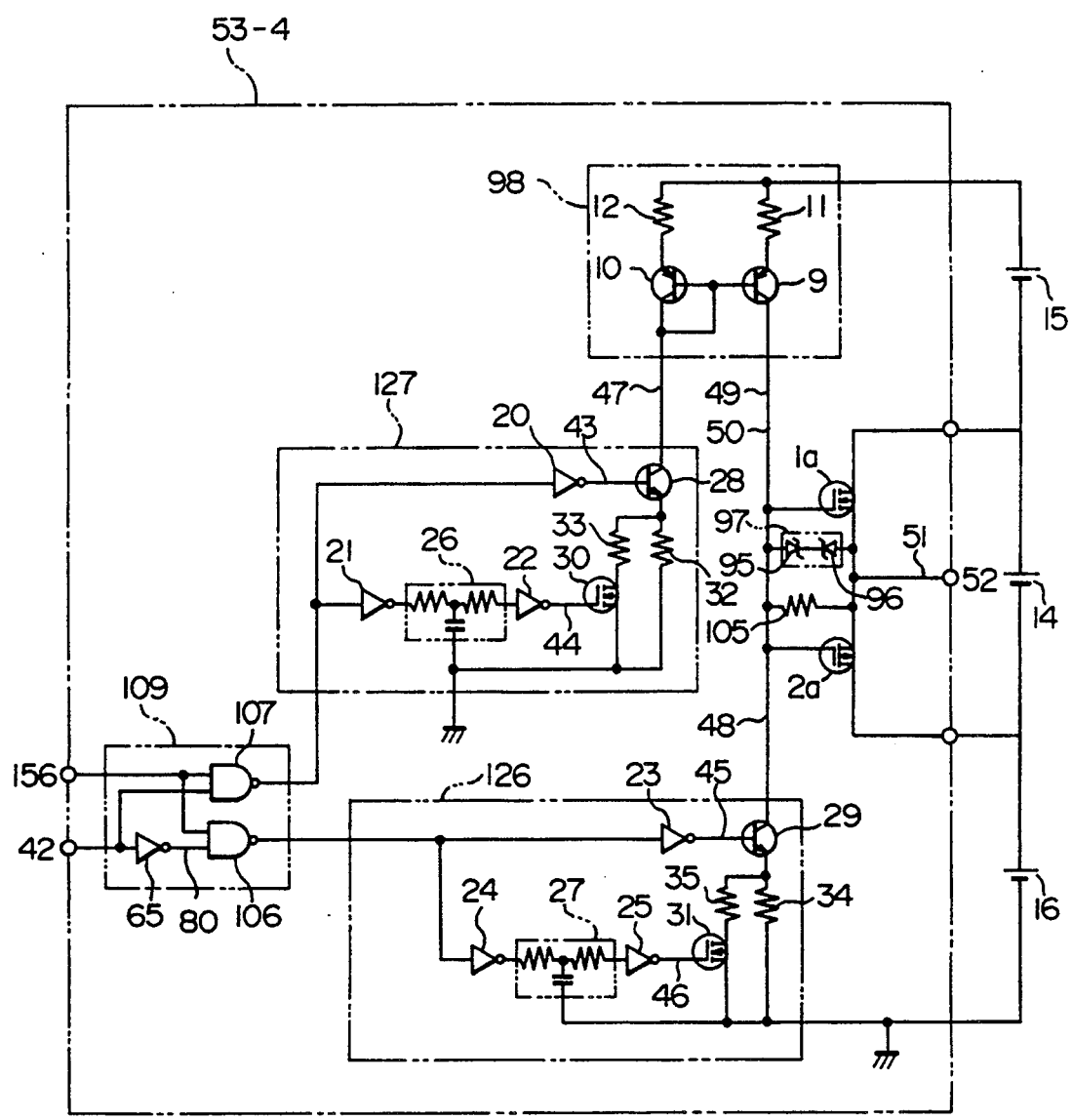
FIG. 7 is a schematic diagram illustrating an output circuit of a PWM inverter according to a fourth embodiment of the present invention.

FIG. 7 schematically illustrates a fourth embodiment.

In FIG. 7, the current control means 126 and 127, the current mirror means 98, the signal processing means 109, the DC main power supply 14, the DC power supplies 15 and 16, the resistor 105, and the voltage limit means 97 including the zener diodes 95 and 96 are the same as those of FIG. 5.

The embodiment of FIG. 7 is different from the embodiment of FIG. 5 in that a power MOS-FET 1a of N channel type and a power MOS-FET 2a of P channel type each including parasitic diode having a short reverse recovery time trr are connected instead of the power MOS-FET's 1 and 2 and the diodes 5, 6, 7 and 8.

Recently, the technique of power MOS-FET's is advanced and the power MOS-FET's including parasitic diodes having a very short reverse recovery time trr are manufactured partially. The circuit configuration of FIG. 7 can be attained by obtaining the power MOS-FET's including the parasitic diodes having the short reverse recovery time trr, and the number of components can be reduced.

In FIGS. 5 and 7, it is needless to say that the PNP transistor 10 may be expressed by a diode.

Embodiment 5

Figure 8:
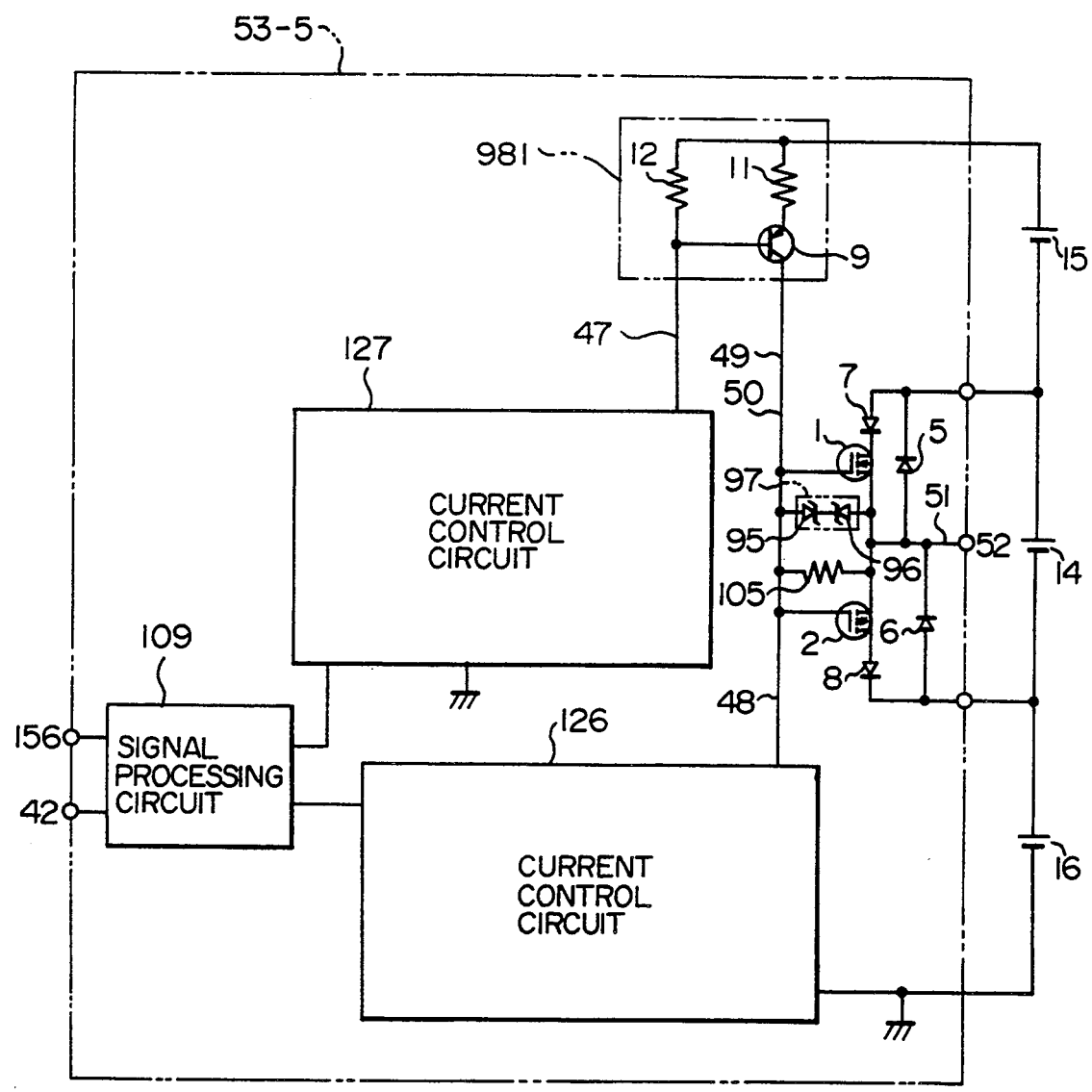
FIG. 8 is a schematic diagram illustrating an output circuit of a PWM inverter according to a fifth embodiment of the present invention.

FIG. 8 schematically illustrates a fifth embodiment.

The embodiment includes simplified current mirror means 981 including the PNP transistor 9 and resistors 11 and 12 instead of the current mirror means 98 including the PNP transistors 9 and 10 and the resistors 11 and 12.

The current mirror means 981 of FIG. 8 possesses inferior accuracy and temperature characteristics as compared with the current mirror means 98 of FIG. 5 and accordingly is required to increase the voltage of the DC power supply 15, while there is no problem practically as far as the voltage of the DC power supply can be increased.

Embodiment 6

Figure 9:
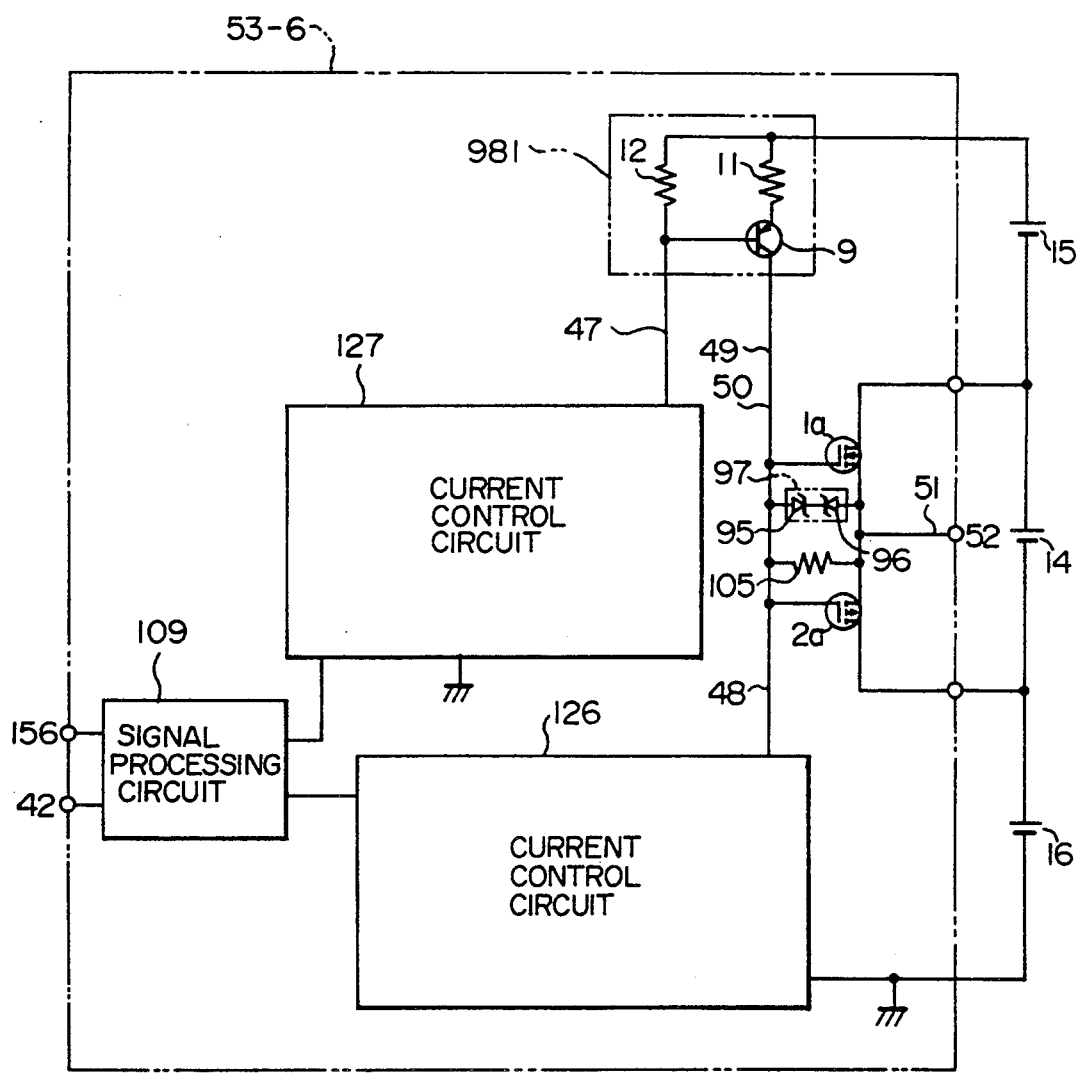
FIG. 9 is a schematic diagram illustrating an output circuit of a PWM inverter according to a sixth embodiment of the present invention.

FIG. 9 schematically illustrates a sixth embodiment.

In the embodiment, the N channel power MOS-FET 1a and the P channel MOS-FET 2a including parasitic diodes having a short reverse recovery time trr are connected instead of the power MOS-FET's 1 and 2 and the diodes 5, 6, 7 and 8 in FIG. 8. Thus, the number of components can be reduced in the same manner as in FIGS. 4 and 7.

Embodiment 7

Figure 10:
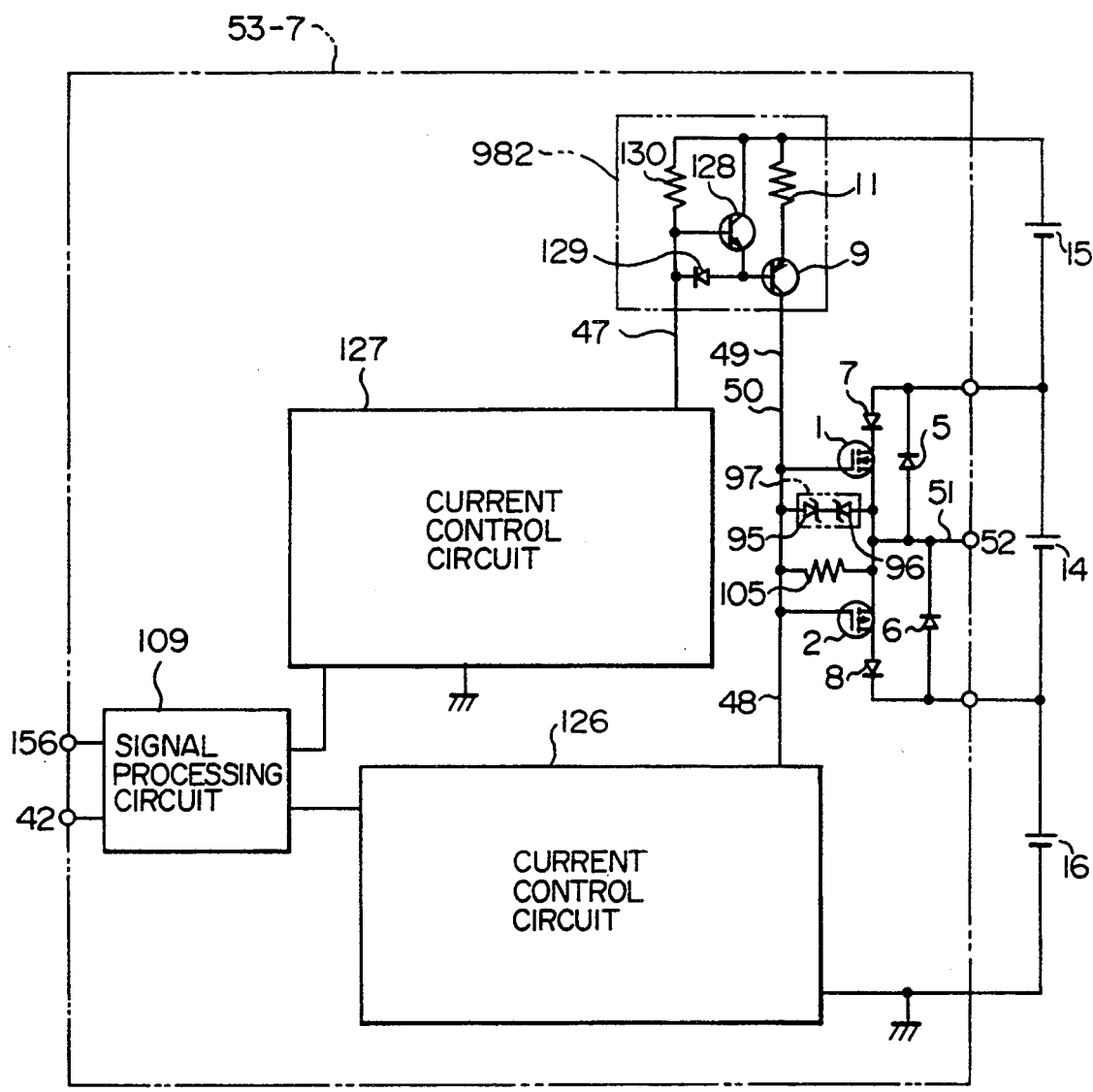
FIG. 10 is a schematic diagram illustrating an output circuit of a PWM inverter according to a seventh embodiment of the present invention.

FIG. 10 schematically illustrates a seventh embodiment.

The embodiment of FIG. 10 includes current mirror means 982 composed of the PNP transistor 9, an NPN transistor 128, a diode 129 and resistors 11 and 130 instead of the current mirror means 98 composed of the PNP transistors 9 and 10 and the resistors 11 and 12 in FIG. 5.

In the current mirror means 98 of FIG. 5, when the collector voltage of the PNP transistor 9 is lowered, the base voltage of the PNP transistor 9 is reduced by the current flowing through a collector output capacitance Cob and the PNP transistor 9 is turned on. Thus, a current leaks into the collector of the PNP transistor 9. Consequently, the falling time of the gate signal voltage 50 is lengthened and the switching loss of the power MOS-FET is increased.

Accordingly, in order to prevent this problem, it is necessary to select the PNP transistor 9 having a very small collector output capacitance Cob.

On the contrary, in the current mirror means of FIG. 10, when the collector voltage of the PNP transistor 9 is lowered, a current flowing through the collector output capacitance Cob is supplemented by an emitter current of the NPN transistor 128. Accordingly, reduction of the base voltage of the PNP transistor 9 can be prevented and the switching loss can be reduced even if the PNP transistor 9 having a relatively large collector output capacitance Cob is selected.

Embodiment 8

Figure 11:
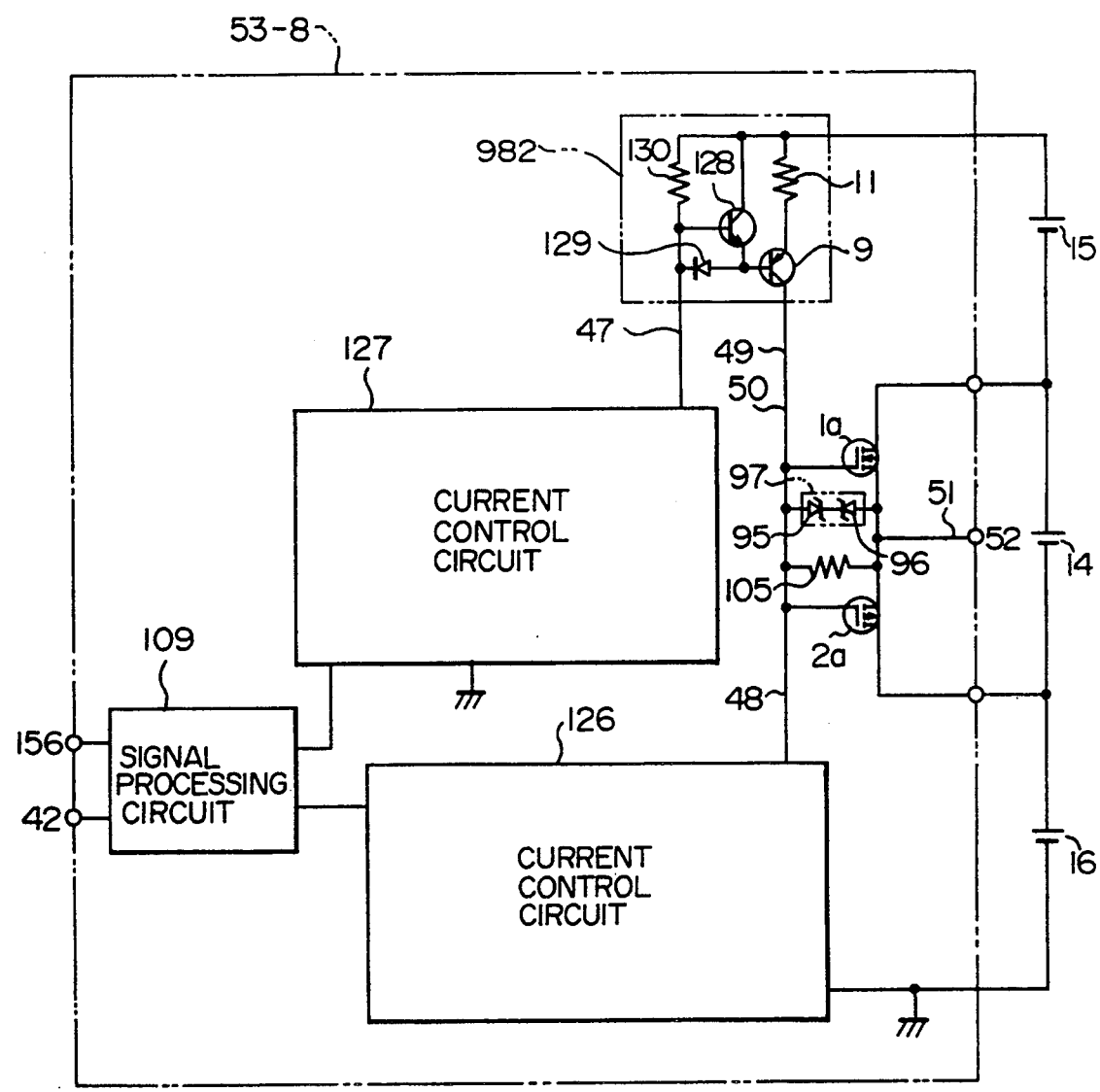
FIG. 11 is a schematic diagram illustrating an output circuit of a PWM inverter according to an eighth embodiment of the present invention.

FIG. 11 schematically illustrates an eighth embodiment.

The embodiment of FIG. 11 includes an N channel power MOS-FET 1a and a P channel power MOS-FET 2a each including a parasitic diode having a short reverse recovery time trr instead of the power MOS-FET's 1 and 2 and the diodes 5, 6, 7 and 8. Thus, the number of components can be reduced in the same manner as in FIGS. 4, 7 and 9.

Embodiment 9

Figure 12:
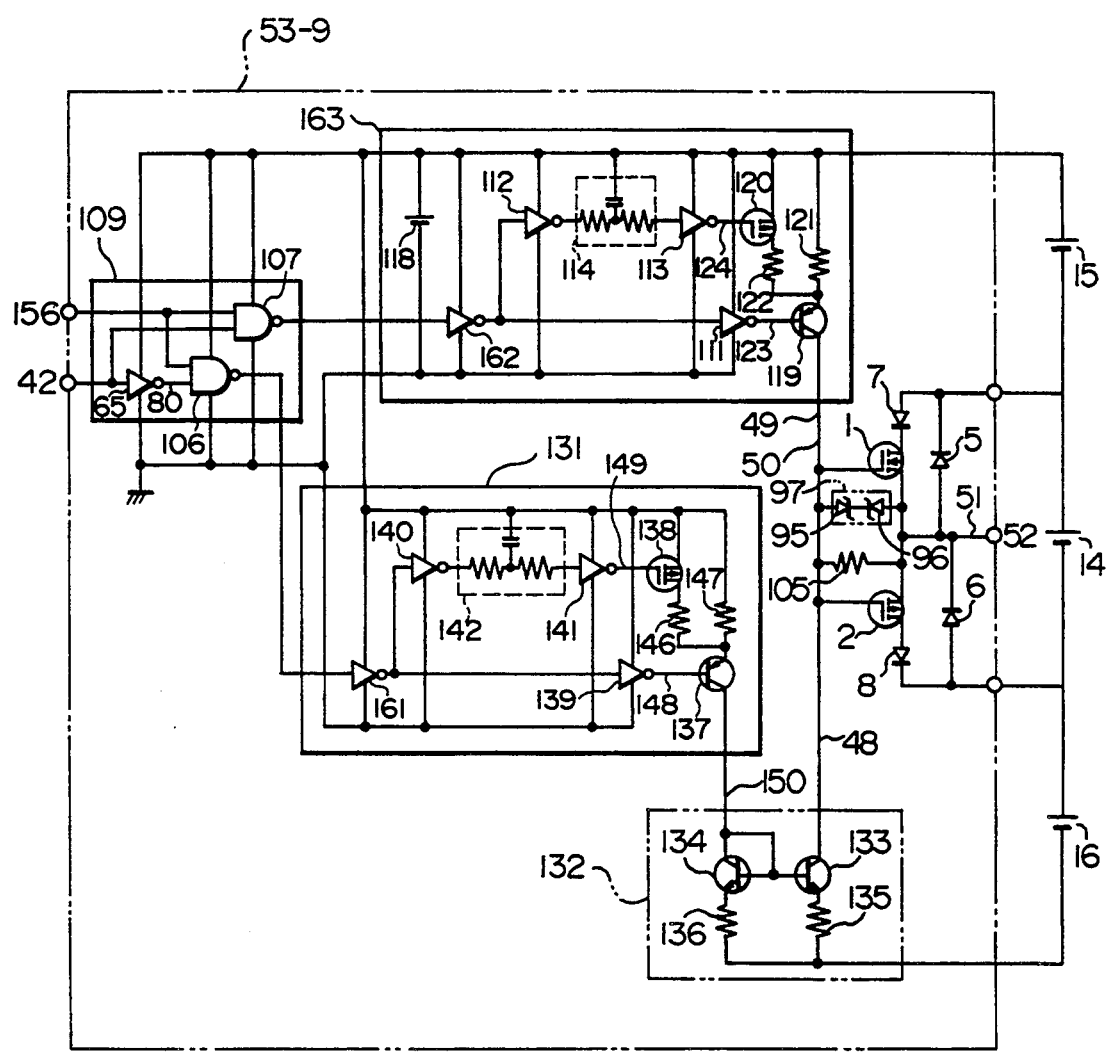
FIG. 12 is a schematic diagram illustrating an output circuit of a PWM inverter according to a ninth embodiment of the present invention.

FIG. 12 schematically illustrates a ninth embodiment.

In the embodiment, current mirror means 132 and current control circuit means 131 are used instead of the current control circuit means 126 of FIG. 1 and current control circuit means 163 is used instead of the current control means 125 of FIG. 1.

In the output circuit of the PWM inverter configured above, operation of the current mirror means 132 and the current control means 131 different from the configuration of FIG. 1 is now described.

For the simplification of description, description is first made to the case where the motor release signal 156 is "H" level, that is, the state that is not the free-running state is commanded, and finally description to the case where the motor release signal 156 is "L" level, that is, the free-running state is commanded is added.

Figure 13:
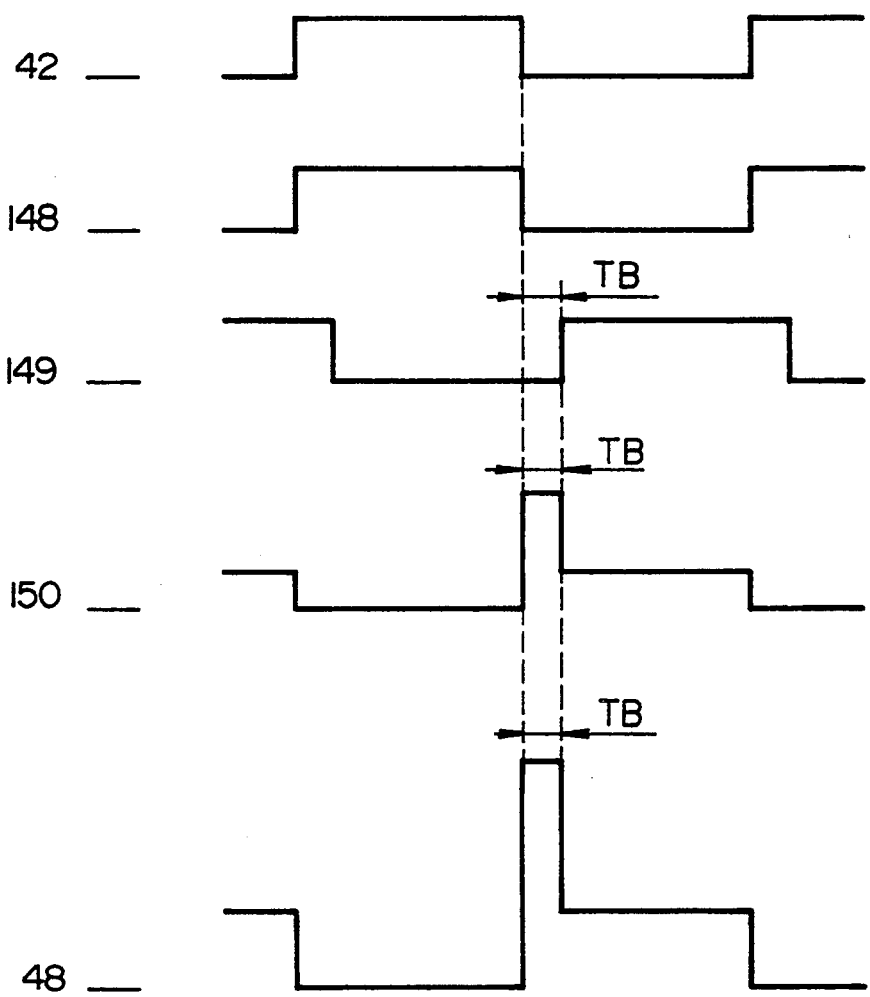
FIG. 13 is a waveform diagram showing operation of current control means of the output circuit of the PWM inverter according to the ninth embodiment of the present invention.

Operation of the current control means 131 is first described in detail with reference to FIG. 13. The switching command signal 42 is supplied through the NAND means 106 and inversion means 65, 161 and 139 to the base of a PNP transistor 137 as a base signal 148. The base signal 148 has the same potential as that of the positive terminal of the DC power supply 15, for example, when the switching command signal 42 is "H" level and has a potential which is 5 V lower than that of the positive terminal of the DC power supply 15, for example, when the switching command signal 42 is "L".

Further, the switching command signal 42 is supplied through the inversion means 65, 161, 140 and 141, the NAND means 106 and signal delay means 142 to the gate of the P channel MOS-FET 138 as a gate signal 149. The gate signal 149 is obtained by delaying an inverted signal of the switching command signal 42 by the delay time TB, and "L" and "H" levels thereof are set to be voltages capable of sufficiently turning on and off the MOS-FET 138, respectively.

The transistor 137 is configured into the emitter follower circuit. When a potential of the base signal 148 is about 0.7 V or more lower than the potential of the positive terminal of the DC power supply 15, a current determined by a value of a resistor connected to the emitter and a voltage applied thereto flows substantially as a collector current 150, and when a difference between the potential of the base signal 148 and the potential of the positive terminal of the DC power supply 15 is lower than about 0.7 V, the collector current 150 is reduced to zero.

The MOS-FET 138 serves to switch a value of the resistor connected to the emitter of the transistor 137, and when the MOS-FET 138 is turned on in the state where the potential of the base signal of the transistor 137 is about 0.7 V or more lower than the potential of the positive terminal of the DC power supply 15, the MOS-FET 138 serves to increase the collector current 150 of the transistor 137.

A relation between the switching command signal 42 and the collector current 150 is now considered. When the switching command signal 42 is "H" level, the collector current 150 is zero, and then until the delay time TB elapses after the switching command signal 42 has been changed to "L" level, the collector current 150 becomes a relatively large current value and is then reduced to a relatively small current value. When the switching command signal 42 is changed to "H" level, the collector current 150 is reduced to zero.

The foregoing is the description for the operation of the current control means 131.

Operation of the current mirror means 132 is now described.

Resistors 135 and 136 and transistors 133 and 134 are configured into the current mirror circuit and serves to control the collector current 48 of the transistor 133 to be a current corresponding to the collector current 150 of the transistor 137 as far as the transistor 133 is not saturated. When the collector voltage of the transistor 133 is lowered excessively and the transistor 133 is saturated to be turned on, a proportional relation of the collector currents 150 and 48 collapses and the next off operation of the transistor 133 is delayed. Accordingly, it is necessary to operate the transistor 133 without saturating the transistor 133. Thus, the lower limit of the collector voltage of the transistor 133 is limited so as not to saturate the transistor 133 by the voltage limit means 97 including the zener diodes 95 and 96.

A relation between the switching command signal 42 and the collector current 48 of the transistor 133 is now considered. When the switching command signal 42 is "H" level, the collector current 48 is zero, and then until the delay time TB elapses after the switching command signal 42 has been changed to "L" level, the collector current 48 is a relatively large current value and is then reduced to a relatively small current value. When the switching command signal 42 is changed to "H" level, the collector current is reduced to zero.

The foregoing is the description for the operation of the current control means 131 and the current mirror means 132 in the case where the motor release signal 156 is "H" level, that is, the state that is not the free-running state is commanded, while finally operation of the current control means 131 and the current mirror means 132 in the case where the motor release signal 156 is "L" level, that is, the free-running state is commanded is now described additionally.

When the motor release signal 156 is "L" level, that is, the free-running state is commanded, the output signal of the NAND means 106 is "H" level regardless of the switching command signal 42. Accordingly, the base signal 148 of the PNP transistor 137 is "H" level. In this state, the collector current 150 is zero and the collector current 48 of the transistor 133 is also zero. This is the so-called fifth state.

It is understood from the foregoing that the current mirror means 132 and the current control means 131 perform the same operation as that of the current control means 126.

The current control circuit means 163 is different from the current control means of FIG. 1 in that inversion means 162 is used instead of the photocoupler 115 of the current control means 125.

The configuration of the current control means 163 can attain substantially the same operation as that of the current control means 125 without consideration of insulation by operating logic elements of the current control circuit means 163 and 131 and the signal processing means 109 by a common power supply.

In FIGS. 12, 14, 15, 16, 17 and 18, it is needless to say that the rising time and the falling time of the voltage 51 of the motor winding terminal can be greatly increased by connecting condensers between the gates and the sources of the power MOS-FET's 1 and 2.

Embodiment 10

Figure 14:
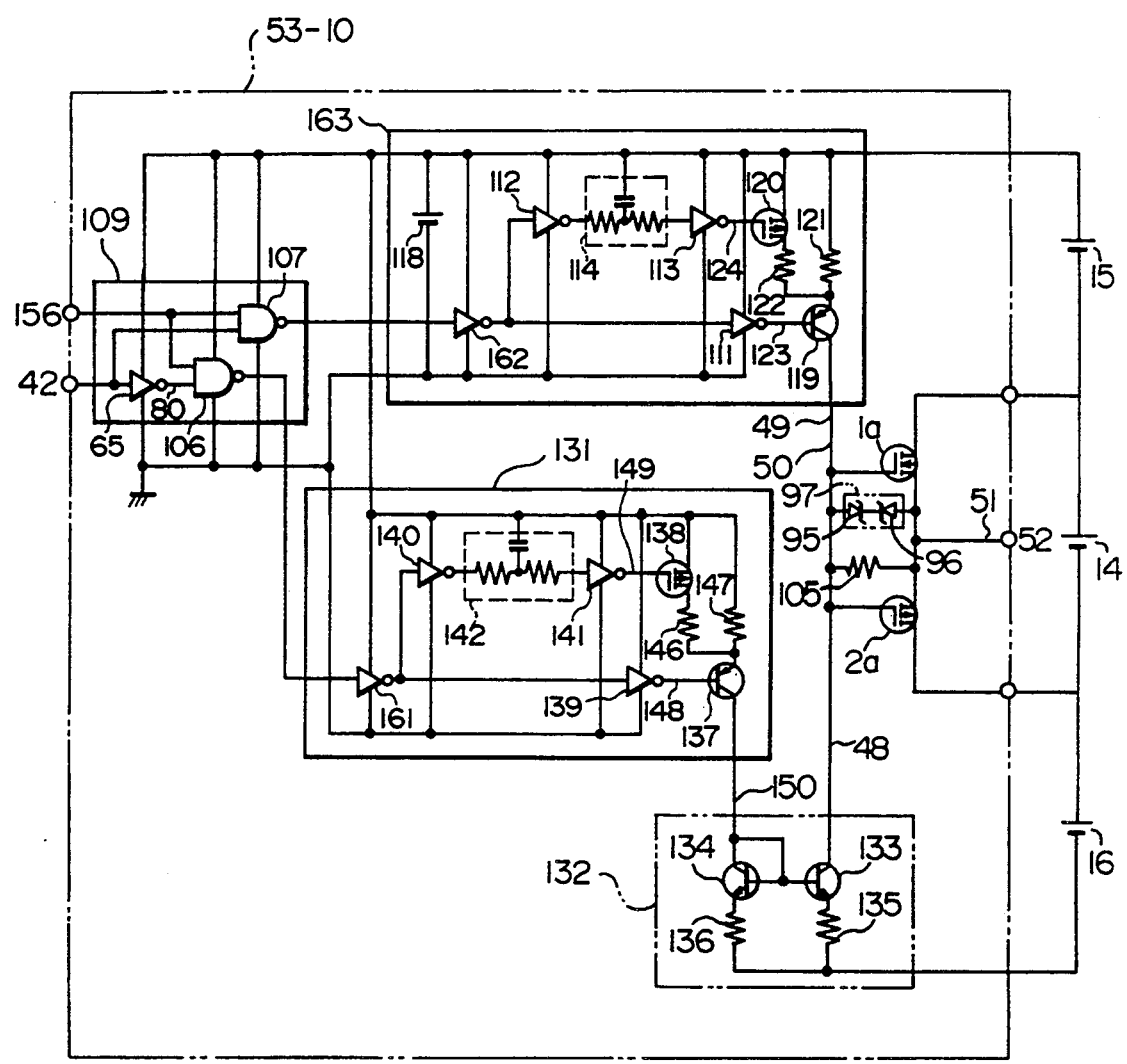
FIG. 14 is a schematic diagram illustrating an output circuit of a PWM inverter according to a tenth embodiment of the present invention.

FIG. 14 schematically illustrates a tenth embodiment.

In the embodiment, an N channel power MOS-FET 1a and a P channel power MOS-FET 2a each including a parasitic diode having a short reverse recovery time trr are connected instead of the power MOS-FET's 1 and 2 and the diodes 5, 6, 7 and 8 of FIG. 12. Thus, the number of components can be reduced in the same manner as the embodiments of FIG. 11 and the like.

It is needless to say that the NPN transistor 134 of FIGS. 12 and 14 may be expressed by a diode.

Embodiment 11

Figure 15:
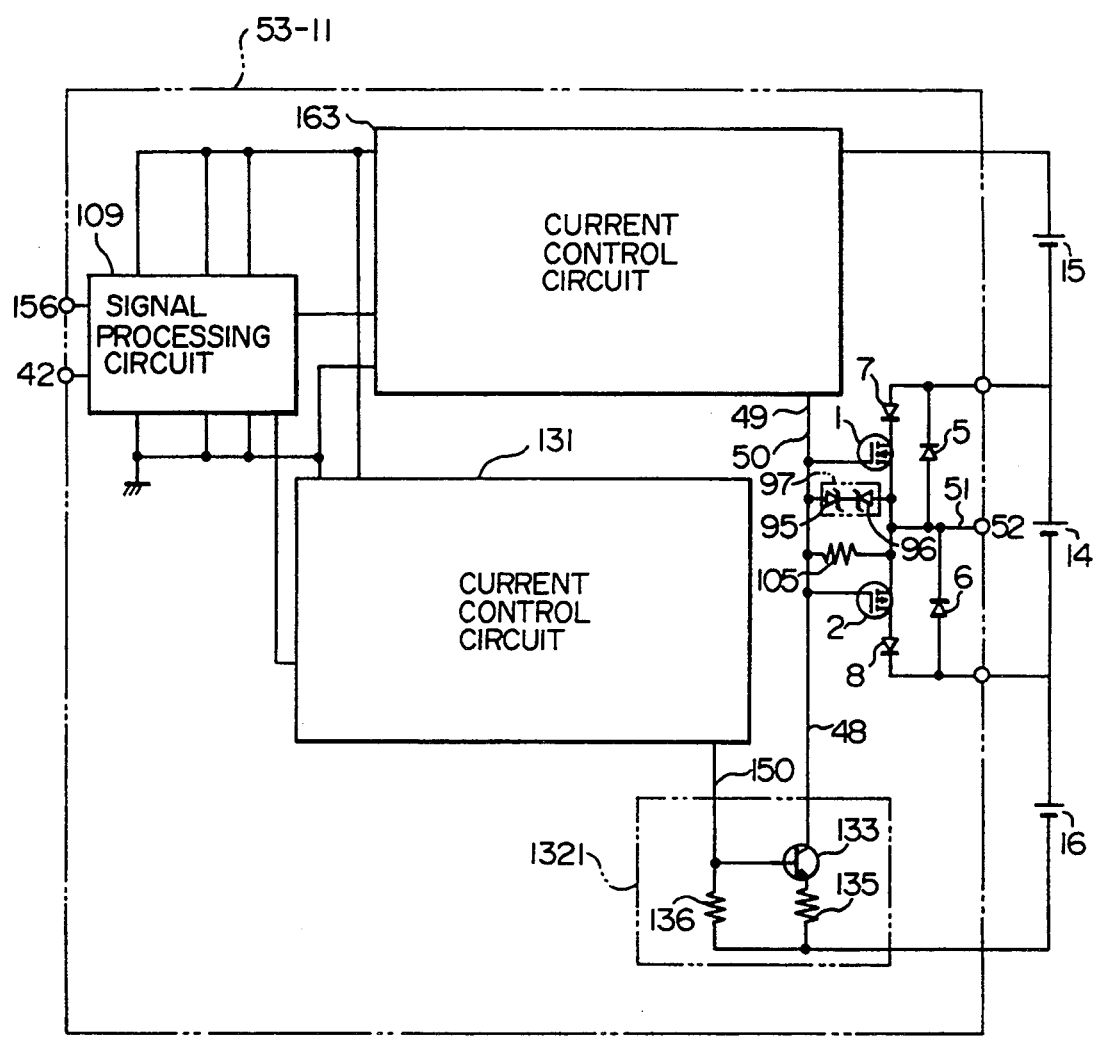
FIG. 15 is a schematic diagram illustrating an output circuit of a PWM inverter according to an eleventh embodiment of the present invention.

FIG. 15 schematically illustrates an eleventh embodiment.

The embodiment includes simplified current mirror means 132 including an NPN transistor 133 and resistors 135 and 136 instead of the current mirror means 132 of FIG. 12.

The current mirror means 132 of FIG. 15 possesses inferior accuracy and temperature characteristics as compared with the current mirror means 132 of FIG. 12 and accordingly is required to increase the voltage of the DC power supply 16, while there is no problem practically as far as the voltage of the DC power supply can be increased.

Embodiment 12

Figure 16:
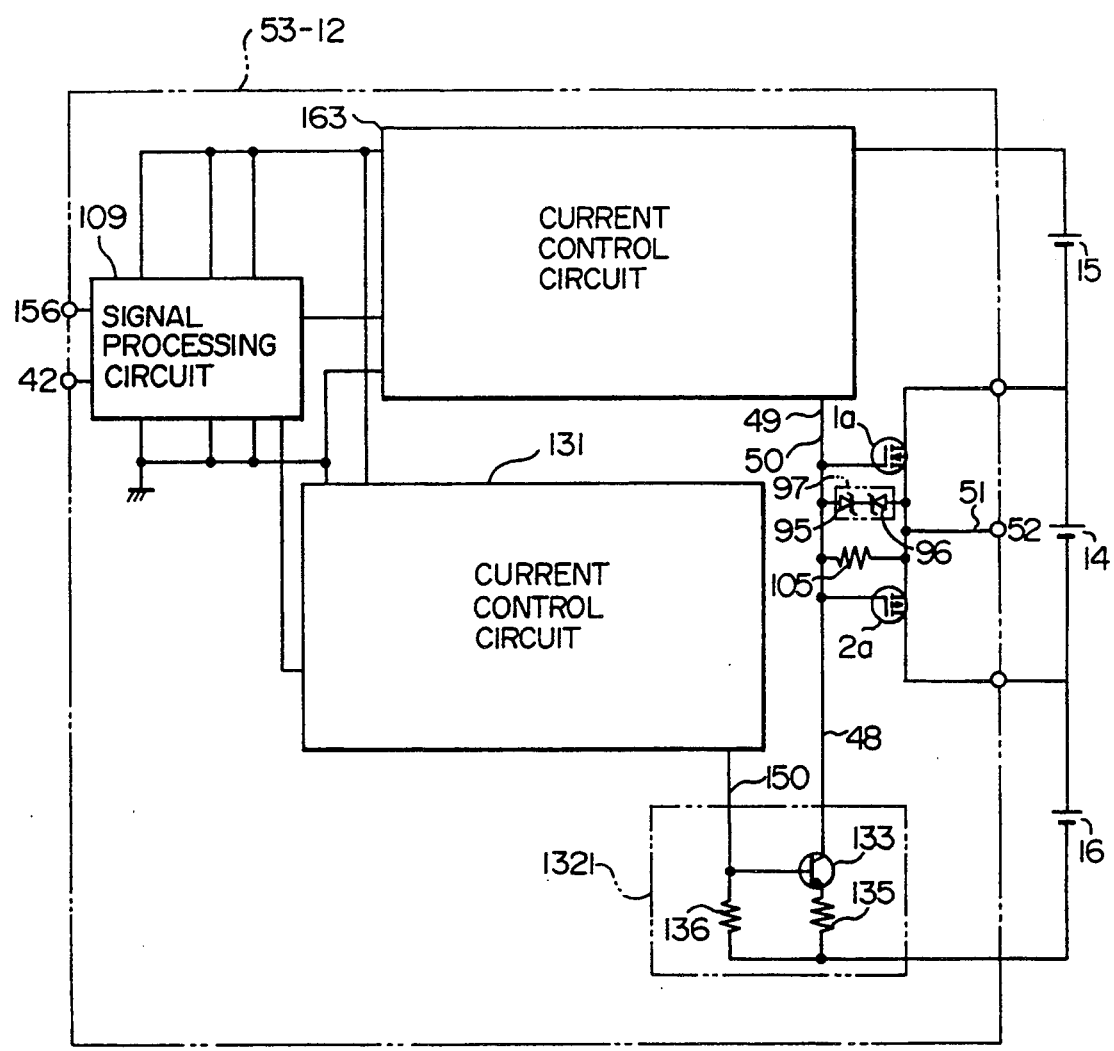
FIG. 16 is a schematic diagram illustrating an output circuit of a PWM inverter according to a twelfth embodiment of the present invention.

FIG. 16 schematically illustrates a twelfth embodiment.

In the embodiment, an N channel power MOS-FET 1a and a P channel power MOS-FET 2a each including a parasitic diode having a short reverse recovery time trr are connected instead of the power MOS-FET's 1 and 2 and the diodes 5, 6, 7 and 8 of FIG. 15. Thus, the number of components can be reduced in the same manner as FIG. 14 and the like.

Embodiment 13

Figure 17:
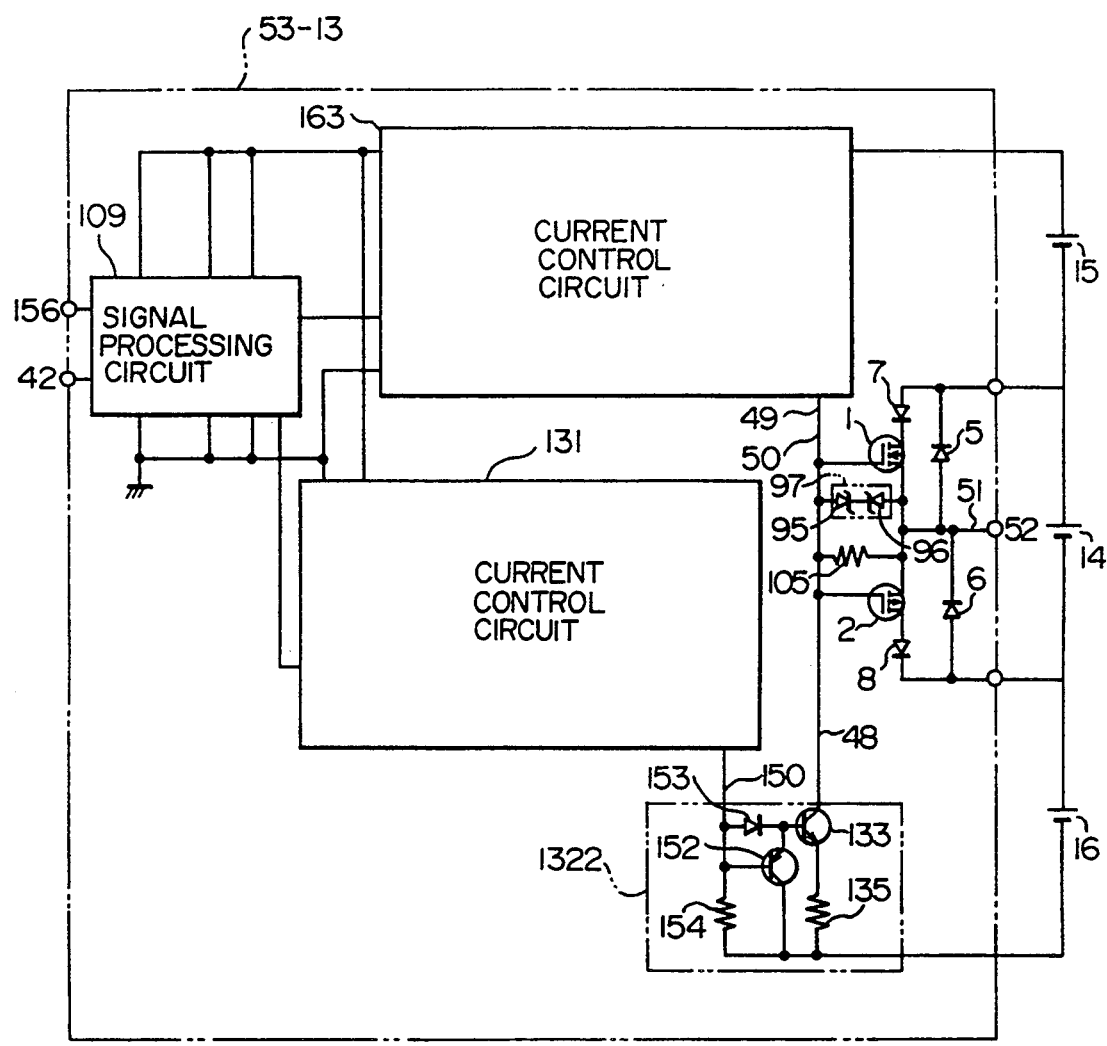
FIG. 17 is a schematic diagram illustrating an output circuit of a PWM inverter according to a thirteenth embodiment of the present invention.

FIG. 17 schematically illustrates a thirteenth embodiment.

The embodiment includes current mirror means 1322 including an NPN transistor 133, a PNP transistor 152, a diode 153 and resistors 135 and 154 instead of the current mirror means 132 of FIG. 12.

In the current mirror means 132 of FIG. 12, when the collector voltage of the NPN transistor 133 is increased, the base voltage of the NPN transistor 133 is increased by the current flowing through the collector output capacitance Cob to thereby turn on the NPN transistor 133. Consequently, a current leaks into the collector of the NPN transistor 133, so that the rising time of the gate signal voltage 50 is lengthened to thereby increase switching loss of the power MOS-FET Accordingly, in order to prevent this problem, it is necessary to select the NPN transistor 133 having a very small collector output capacitance Cob.

On the contrary, in the current mirror means 1322 of FIG. 17, when the collector voltage of the NPN transistor 133 is increased, the current flowing through the collector output capacitance Cob can be removed by the emitter current of the PNP transistor 152, so that the increase of the base voltage of the NPN transistor 133 can be prevented to thereby reduce the switching loss even if the NPN transistor 133 having a relatively large collector output capacitance Cob is selected.

Embodiment 14

A fourteenth embodiment of the present invention is now described with reference to FIG. 18.

Figure 18:
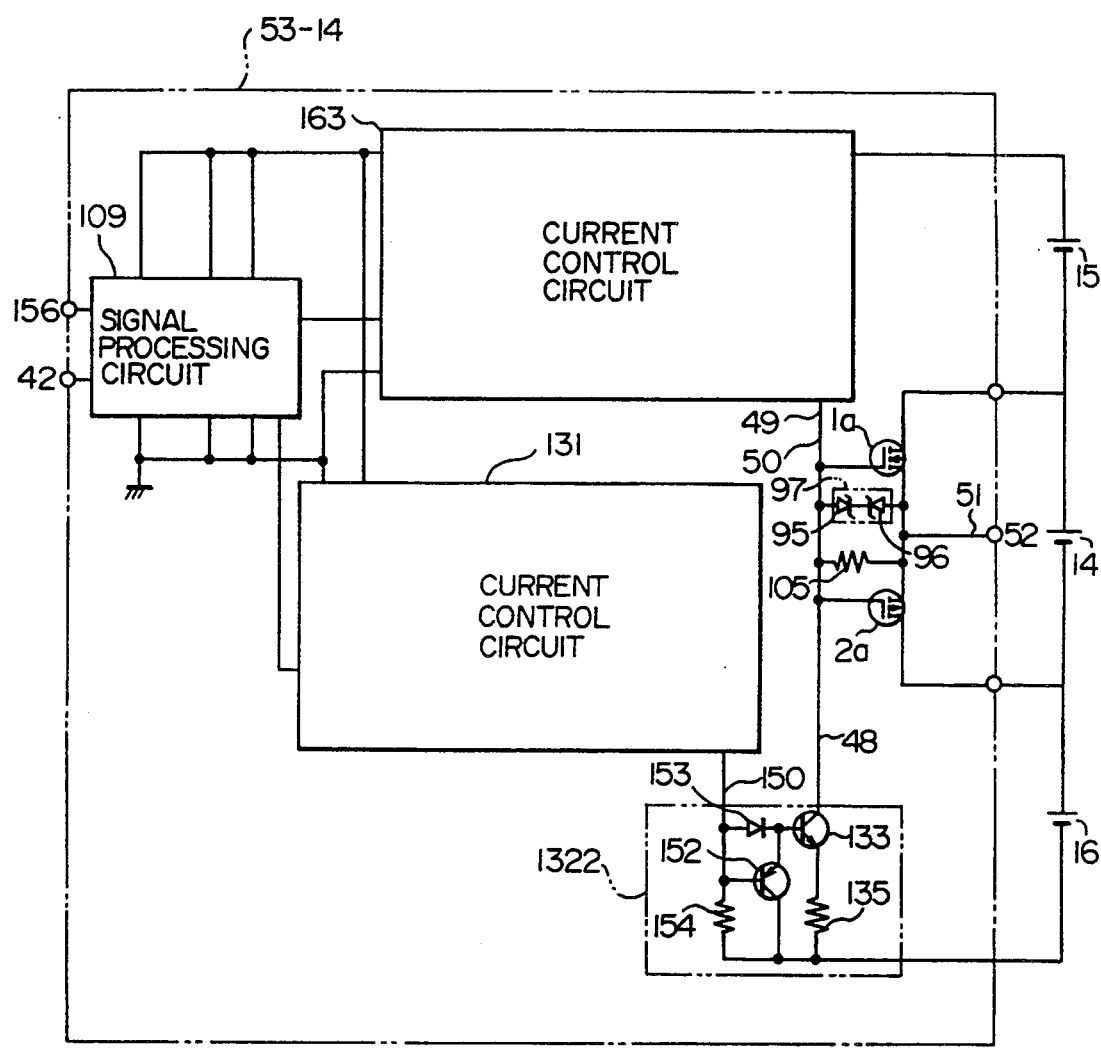
FIG. 18 is a schematic diagram illustrating an output circuit of a PWM inverter according to a fourteenth embodiment of the present invention.

In FIG. 18, the same reference numerals as those of FIG. 17 designate like elements.

The embodiment of FIG. 18 is different from the embodiment of FIG. 17 in that an N channel power MOS-FET 1a and a P channel power MOS-FET 2a including parasitic diodes having a short reverse recovery time trr are connected instead of the power MOS-FET's 1 and 2 and the diodes 5, 6, 7 and 8 of FIG. 17. Thus, the number of components can be reduced in the same manner as in FIGS. 16 and 14 and the like.

Figure 31:
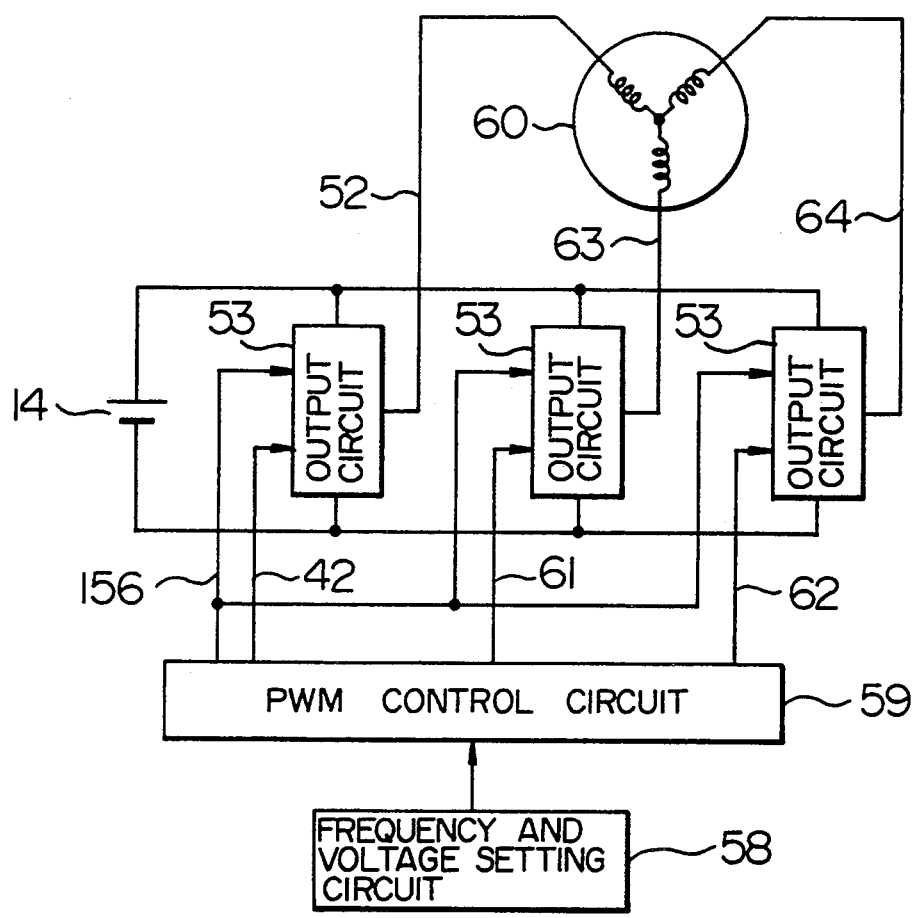
FIG. 31 is a schematic diagram illustrating a general PWM inverter.
Figure 32:
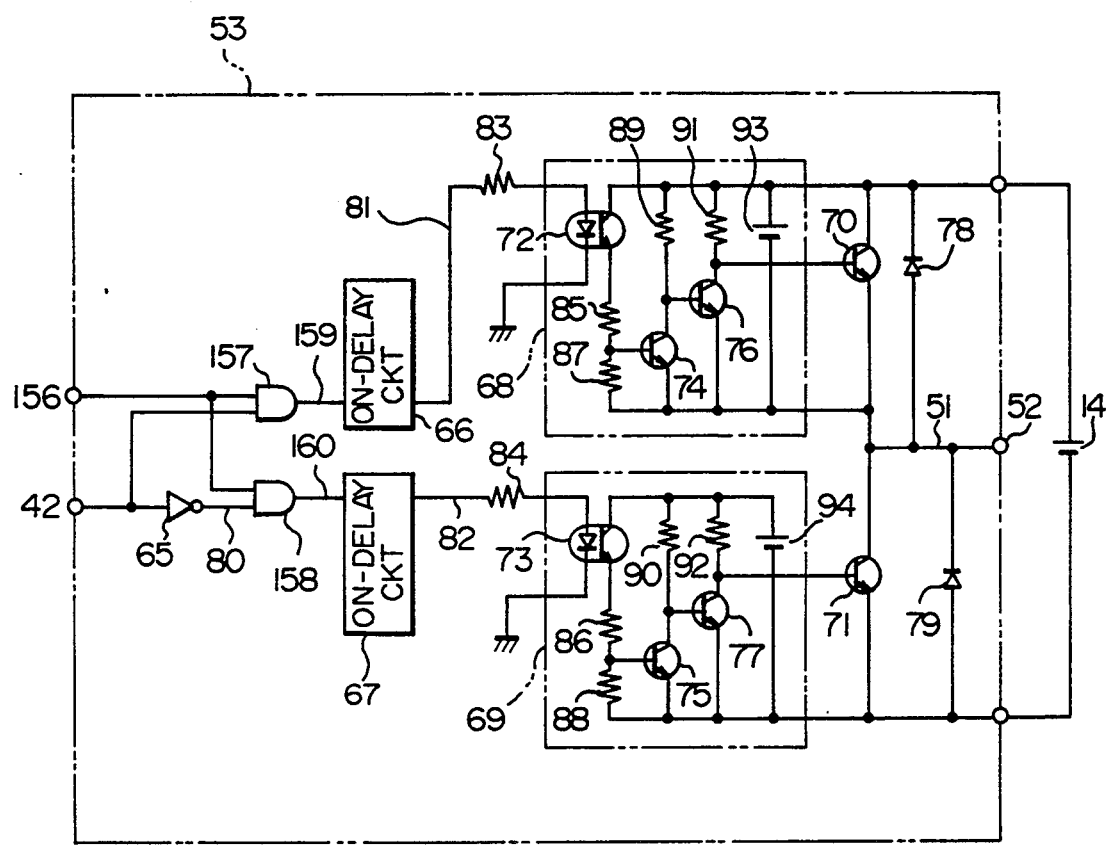
FIG. 32 is a schematic diagram illustrating a conventional output circuit of a PWM inverter.
Figure 33:
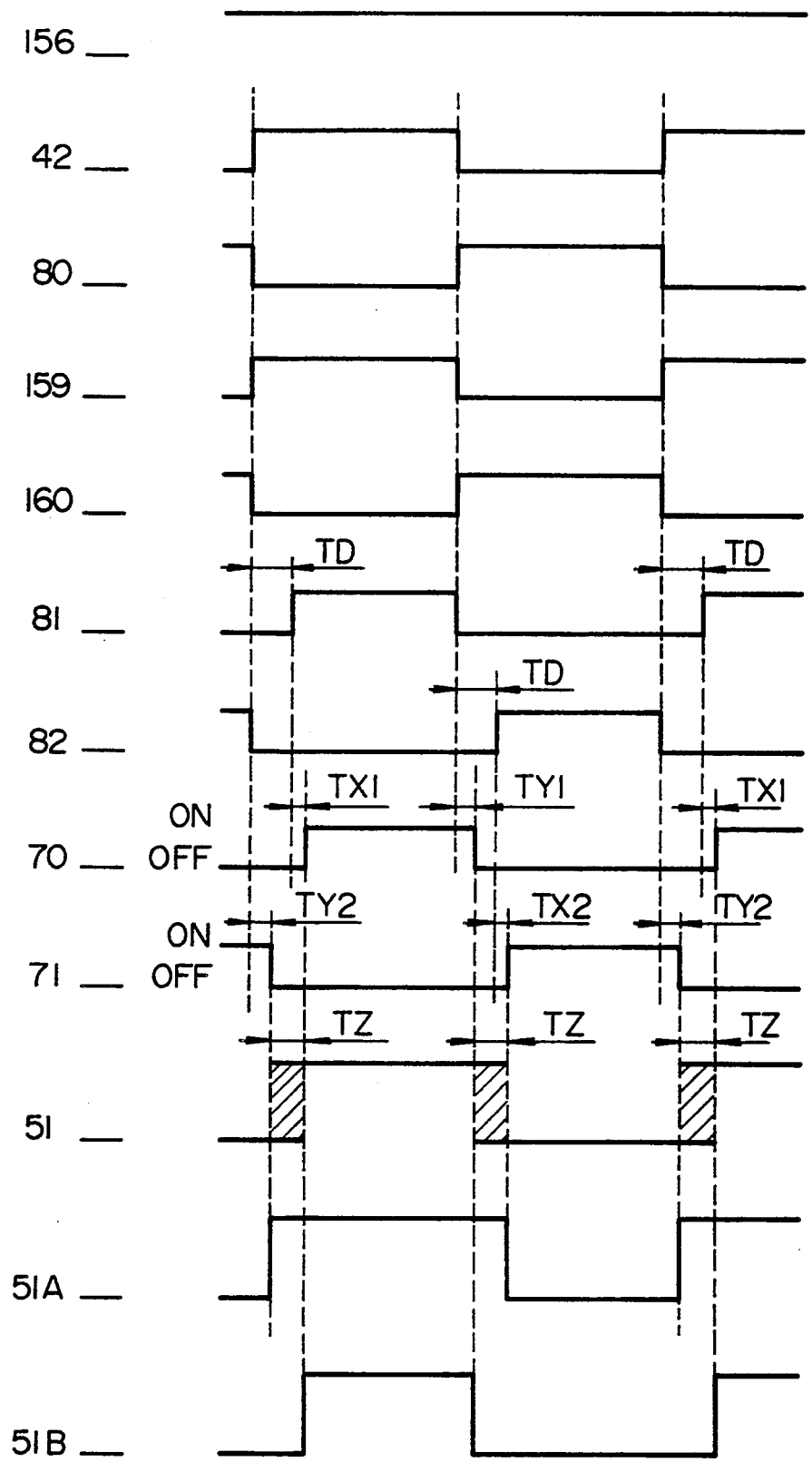
FIG. 33 is a waveform diagram showing operation of the conventional output circuit of the PWM inverter.

When the three-phase PWM inverter is configured as shown in FIG. 31, the DC main power supply is generally connected in common and three output circuits of the PWM inverter are provided, while in the output circuit of the PWM inverter according to the present invention it is needless to say that the DC power supplies 15 and 16 in the first to fourteenth embodiments can be connected in common.

Embodiment 15

Figure 19:
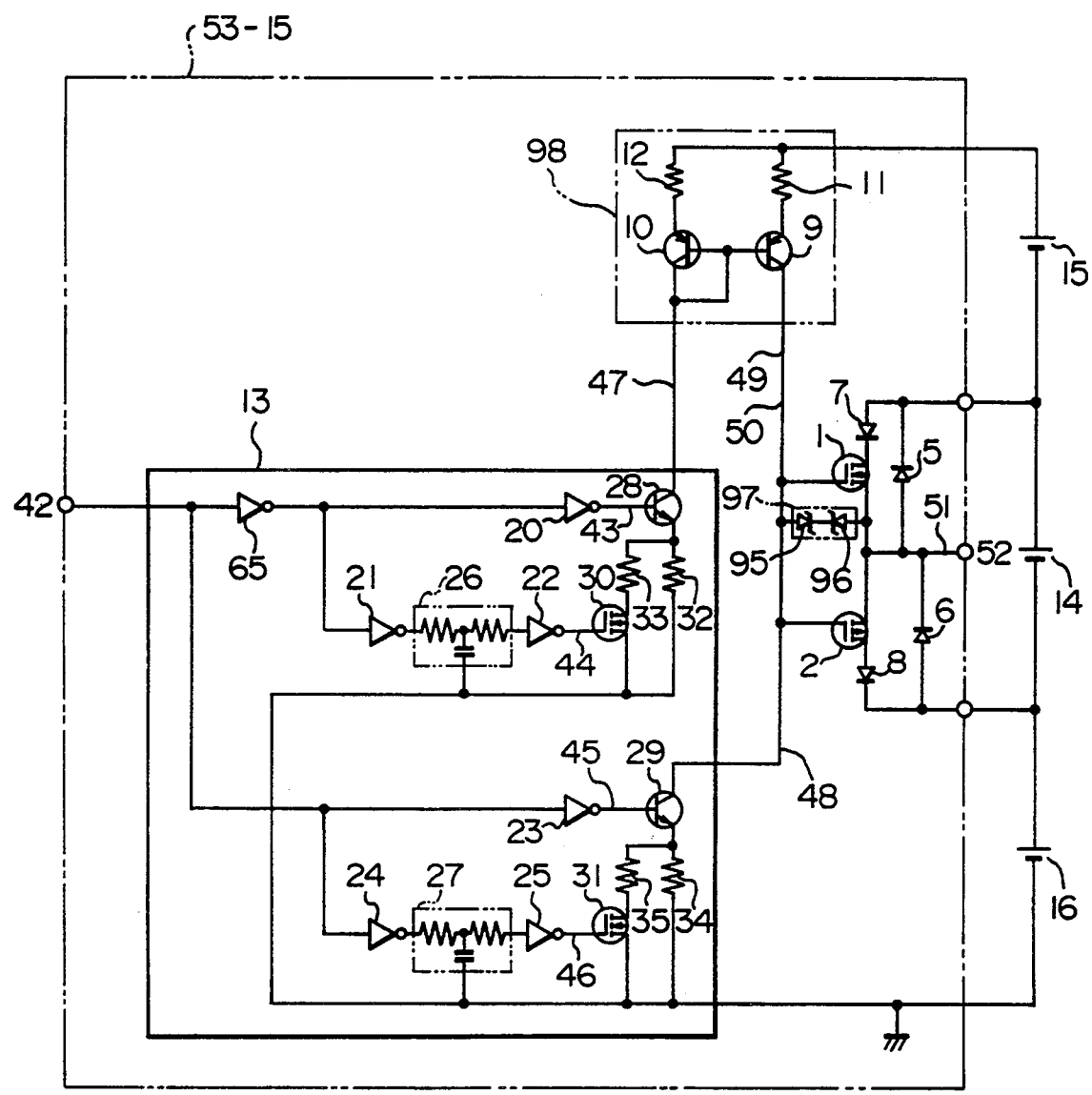
FIG. 19 is a schematic diagram illustrating an output circuit of a PWM inverter according to a fifteenth embodiment of the present invention.

FIG. 19 schematically illustrates a fifth embodiment. Similarly to FIG. 5, it includes N channel power MOS-FET 1, P channel power MOS-FET 2, diodes 5 to 8, current mirror means 98, DC main power supply 14, DC power supplies 15 and 16, and voltage limit means 97 including zener diodes 95 and 96.

The fifth embodiment is different from the embodiment of FIG. 5 in that the resistor 105 of FIG. 5 is removed, and the current control means 126 and 127 and the signal processing means 109 of FIG. 5 are replaced by current control circuit means 13.

When it is not necessary to set the motor to the free-running state, the configuration of FIG. 19 can be adopted.

Further, it is needless to say that the rising time and the falling time of the voltage 51 of the motor winding terminal can be lengthened greatly by connecting condensers between the gates and the sources of the power MOS-FET's 1 and 2 even in FIGS. 19 to 24.

Embodiment 16

Figure 20:
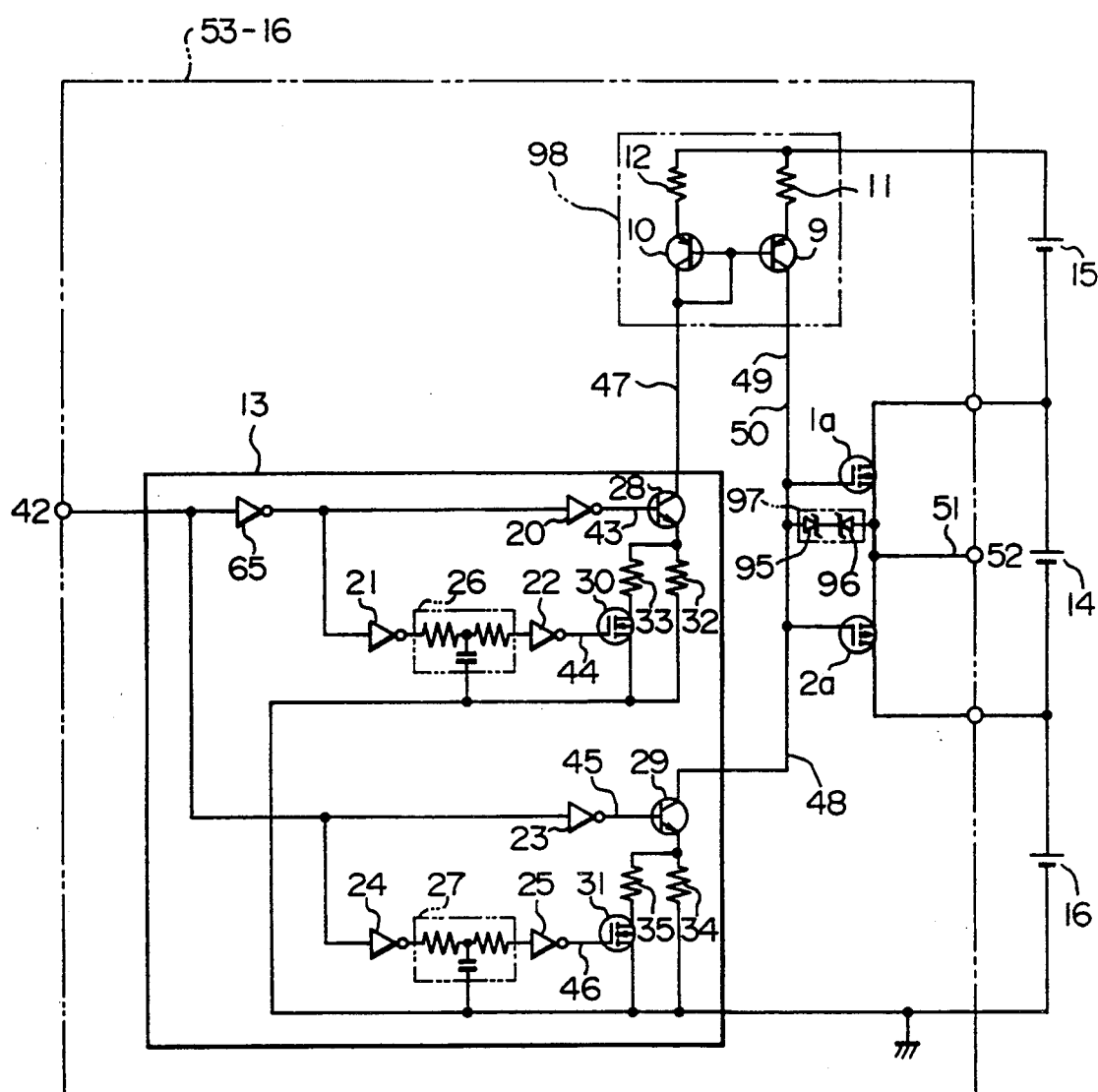
FIG. 20 is a schematic diagram illustrating an output circuit of a PWM inverter according to a sixteenth embodiment of the present invention.

FIG. 20 schematically illustrates a sixteenth embodiment.

In the embodiment, an N channel power MOS-FET's 1a and a P channel power MOS-FET's 2a including parasitic diodes having a short reverse recovery time trr are connected instead of the power MOS-FET's 1 and 2 and the diodes 5, 6, 7 and 8 in FIG. 19. Thus, the number of components can be reduced in the same manner as in FIG. 7 and the like.

It is needless to say that the PNP transistor 10 of FIGS. 19 and 20 may be expressed by a diode.

Embodiment 17

Figure 21:
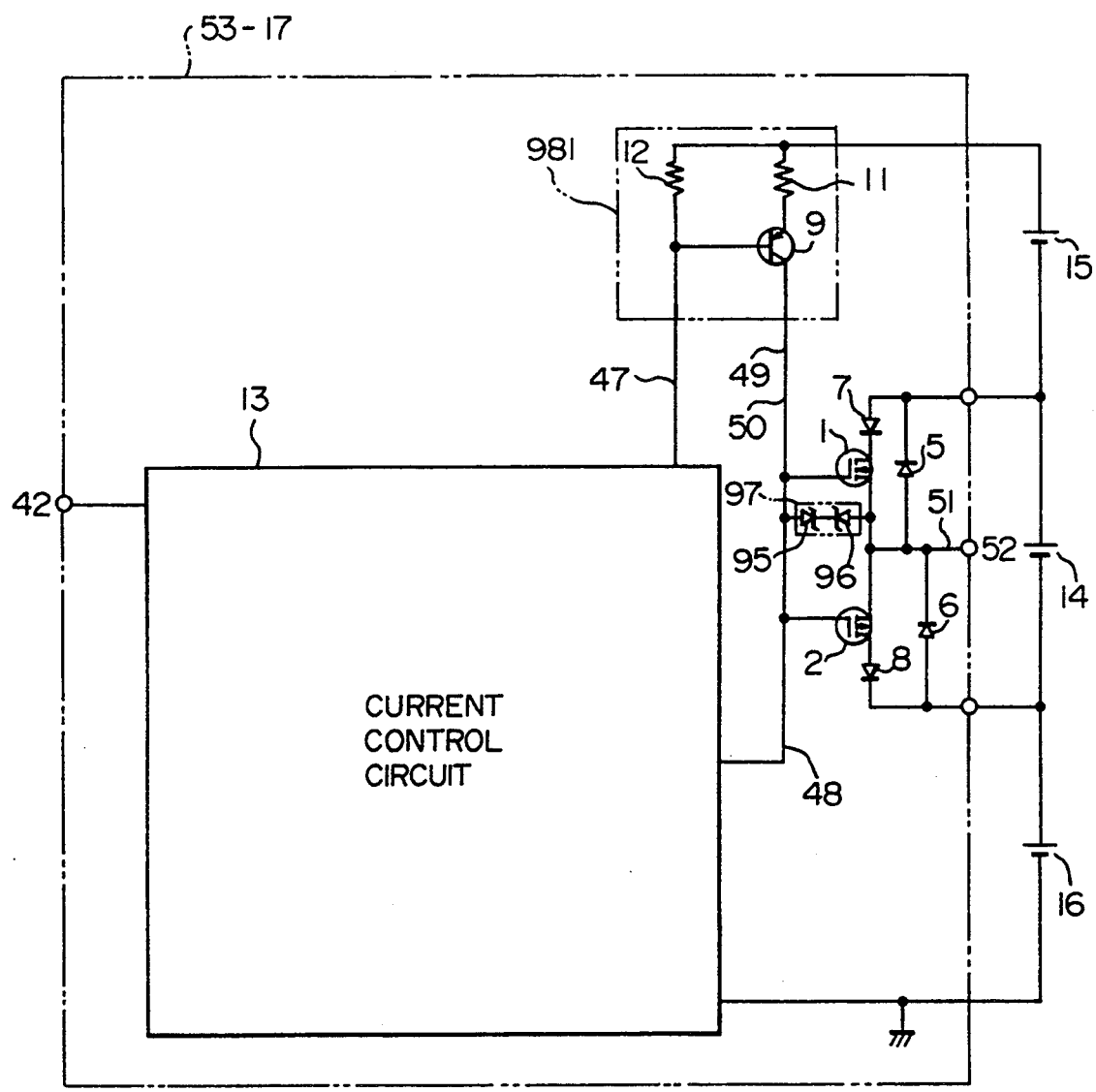
FIG. 21 is a schematic diagram illustrating an output circuit of a PWM inverter according to a seventeenth embodiment of the present invention.

FIG. 21 schematically illustrates a seventeenth embodiment.

The embodiment includes simplified current mirror means 98 including a PNP transistor 9 and resistors 11 and 12 instead of the current mirror means 98 including the PNP transistors 9 and 10 and the resistors 11 and 12 of FIG. 19. The current mirror means of FIG. 21 possesses inferior accuracy and temperature characteristics as compared with the current mirror means 98 of FIG. 19 and accordingly is required to increase the voltage of the DC power supply 15, while there is no problem practically as far as the voltage of the DC power supply can be increased.

Embodiment 18

Figure 22:
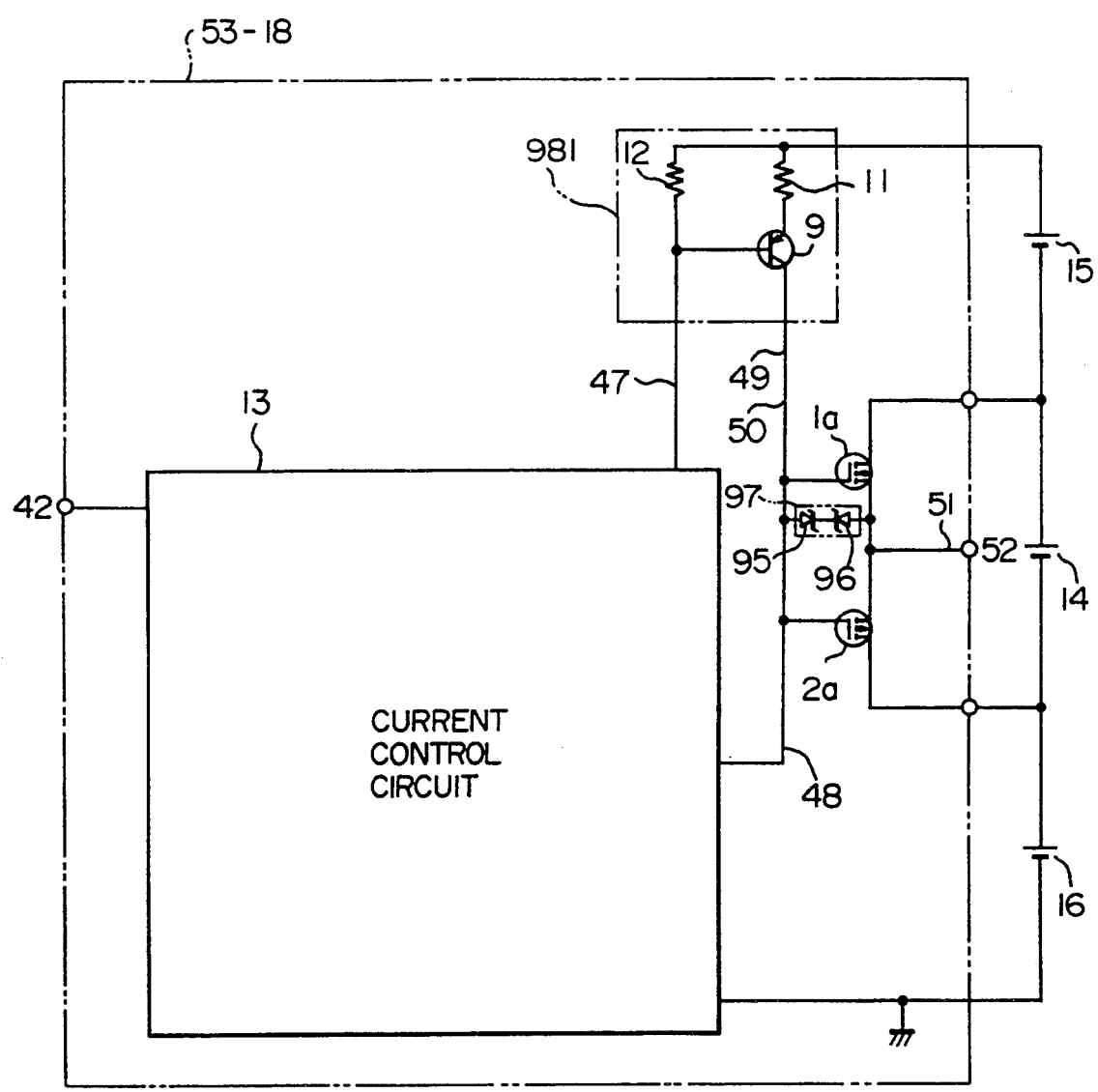
FIG. 22 is a schematic diagram illustrating an output circuit of a PWM inverter according to an eighteenth embodiment of the present invention.

FIG. 22 schematically illustrates an eighteenth embodiment.

In the embodiment, an N channel power MOS-FET's 1a and a P channel power MOS-FET's 2a including parasitic diodes having a short reverse recovery time trr are connected instead of the power MOS-FET's 1 and 2 and the diodes 5, 6, 7 and 8 in FIG. 21. Thus, the number of components can be reduced in the same manner as in FIG. 20 and the like.

Embodiment 19

Figure 23:
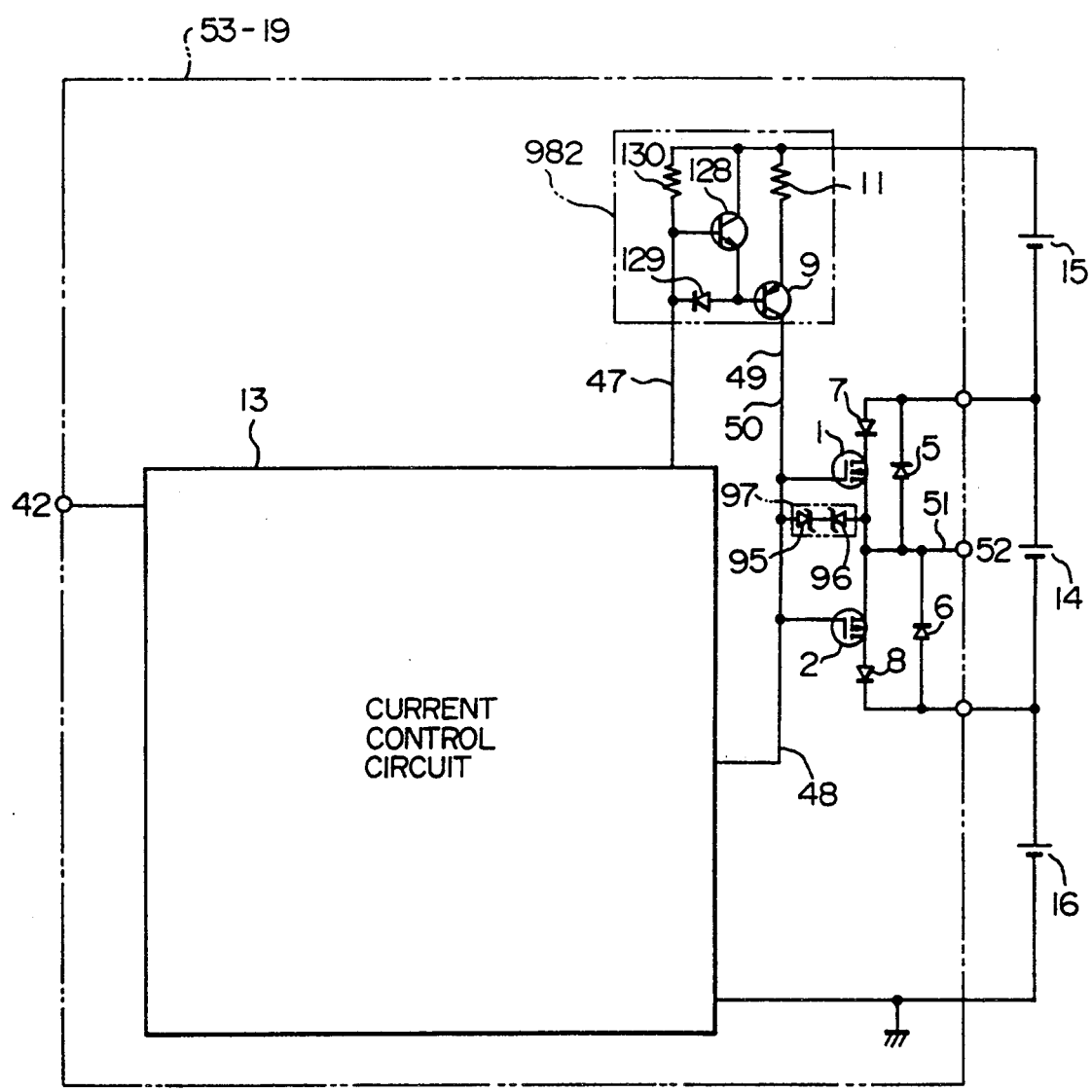
FIG. 23 is a schematic diagram illustrating an output circuit of a PWM inverter according to a nineteenth embodiment of the present invention.

FIG. 23 schematically illustrates a nineteenth embodiment.

The embodiment includes current mirror means 982 including a PNP transistor 9, an NPN transistor 128, a diode 129 and resistors 11 and 130 instead of the current mirror means 98 of FIG. 19.

In the current mirror means 98 of FIG. 19, when the collector voltage of the PNP transistor 9 is lowered, the base voltage of the PNP transistor 9 is lowered by the current flowing through the collector output capacitance Cob to thereby turn on the PNP transistor 9. Consequently, a current leaks into the collector of the PNP transistor 9, so that the falling time of the gate signal voltage 50 is lengthened to thereby increase switching loss of the power MOS-FET.

Accordingly, in order to prevent this problem, it is necessary to select the PNP transistor 9 having a very small collector output capacitance Cob.

On the contrary, in the current mirror means 982 of FIG. 23, when the collector voltage of the PNP transistor 9 is lowered, the current flowing through the collector output capacitance Cob can be supplemented by the emitter current of the NPN transistor 128, so that reduction of the base voltage of the PNP transistor 9 can be prevented to thereby reduce the switching loss even if the PNP transistor 9 having a relatively large collector output capacitance Cob is selected.

Embodiment 20

Figure 24:
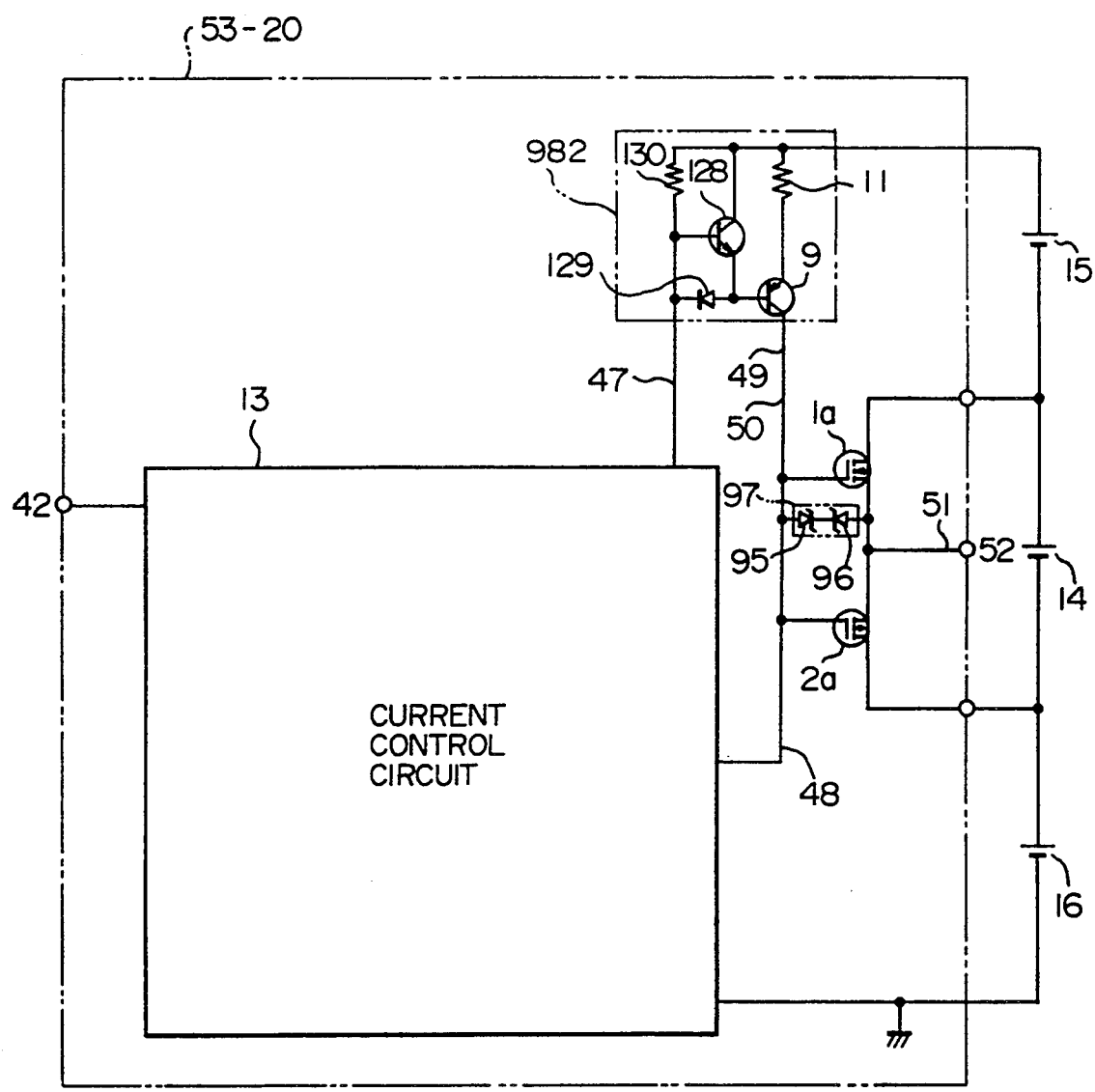
FIG. 24 is a schematic diagram illustrating an output circuit of a PWM inverter according to a twentieth embodiment of the present invention.

FIG. 24 schematically illustrates a twentieth embodiment.

In the embodiment, an N channel power MOS-FET 1a and a P channel power MOS-FET 2a including parasitic diodes having a short reverse recovery time trr are connected instead of the power MOS-FET's 1 and 2 and the diodes 5, 6, 7 and 8 of FIG. 23. Thus, the number of components can be reduced in the same manner as in FIGS. 20 and 22 and the like.

Embodiment 21

Figure 25:
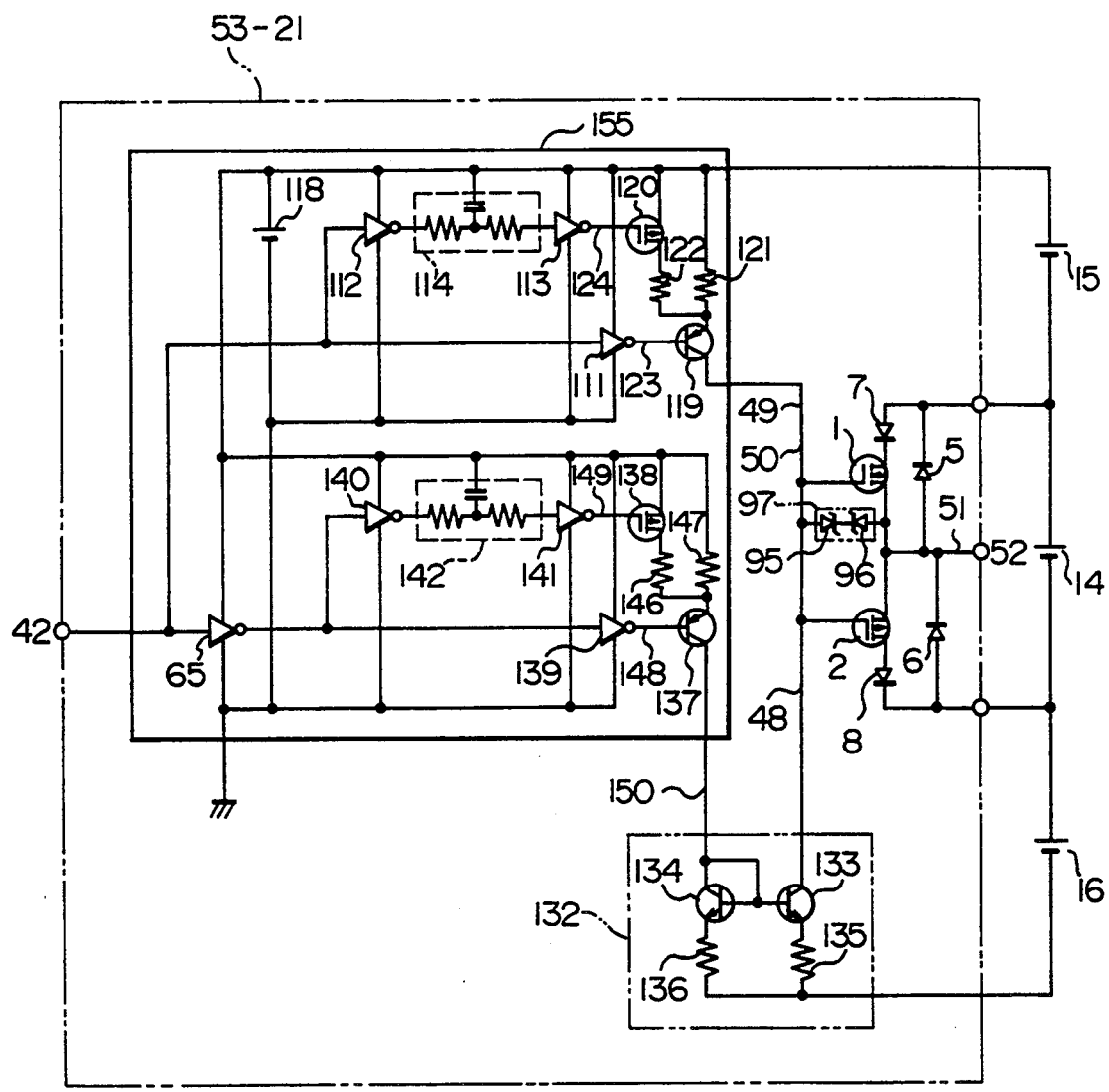
FIG. 25 is a schematic diagram illustrating an output circuit of a PWM according to a twenty-first embodiment of the present invention.

FIG. 25 schematically illustrates a twenty-first embodiment.

The embodiment is different from the embodiment of FIG. 12 in that the resistor 105 of FIG. 12 is removed, and the current control means 131 and 163 and the signal processing means 109 of FIG. 12 are replaced by signal processing circuit means 155.

When it is not necessary to set the motor to be the free-running state, the configuration of FIG. 25 can be adopted.

Further, it is needless to say that the rising time and the falling time of the voltage 51 of the motor winding terminal can be lengthened greatly by connecting condensers between the gates and the sources of the power MOS-FET's 1 and 2 even in FIGS. 25 to 30.

Embodiment 22

FIG. 22 schematically illustrates a twenty-second embodiment.

In the embodiment, an N channel power MOS-FET 1a and a P channel power MOS-FET 2a including parasitic diodes having a short reverse recovery time trr are connected instead of the power MOS-FET's 1 and 2 and the diodes 5, 6, 7 and 8 of FIG. 25. Thus, the number of components can be reduced in the same manner as in FIG. 24 and the like.

Figure 26:
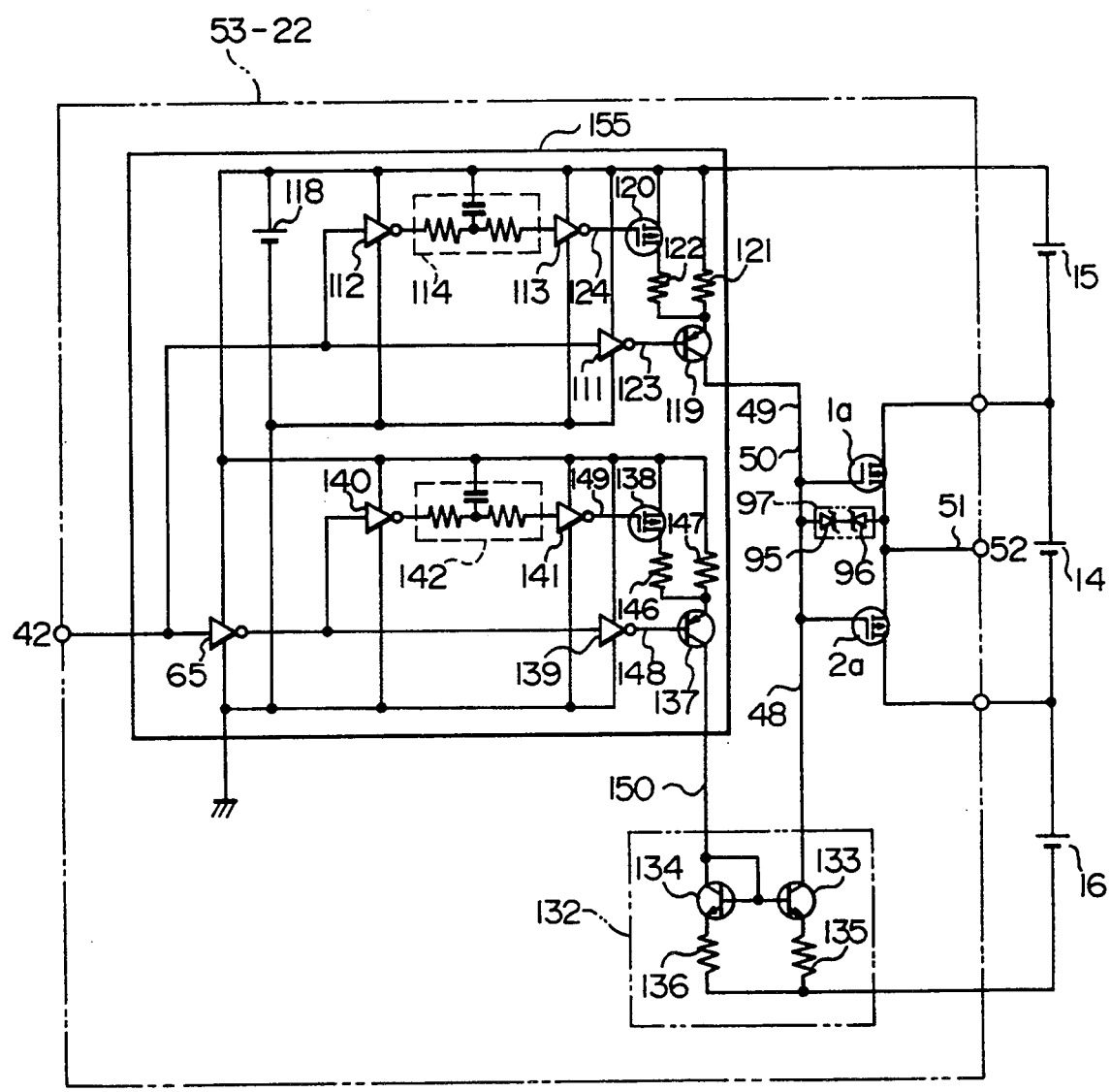
FIG. 26 is a schematic diagram illustrating an output circuit of a PWM inverter according to twenty-second embodiment of the present invention.

It is needless to say that the NPN transistor 134 of FIGS. 25 and 26 may be expressed by a diode.

Embodiment 23

Figure 27:
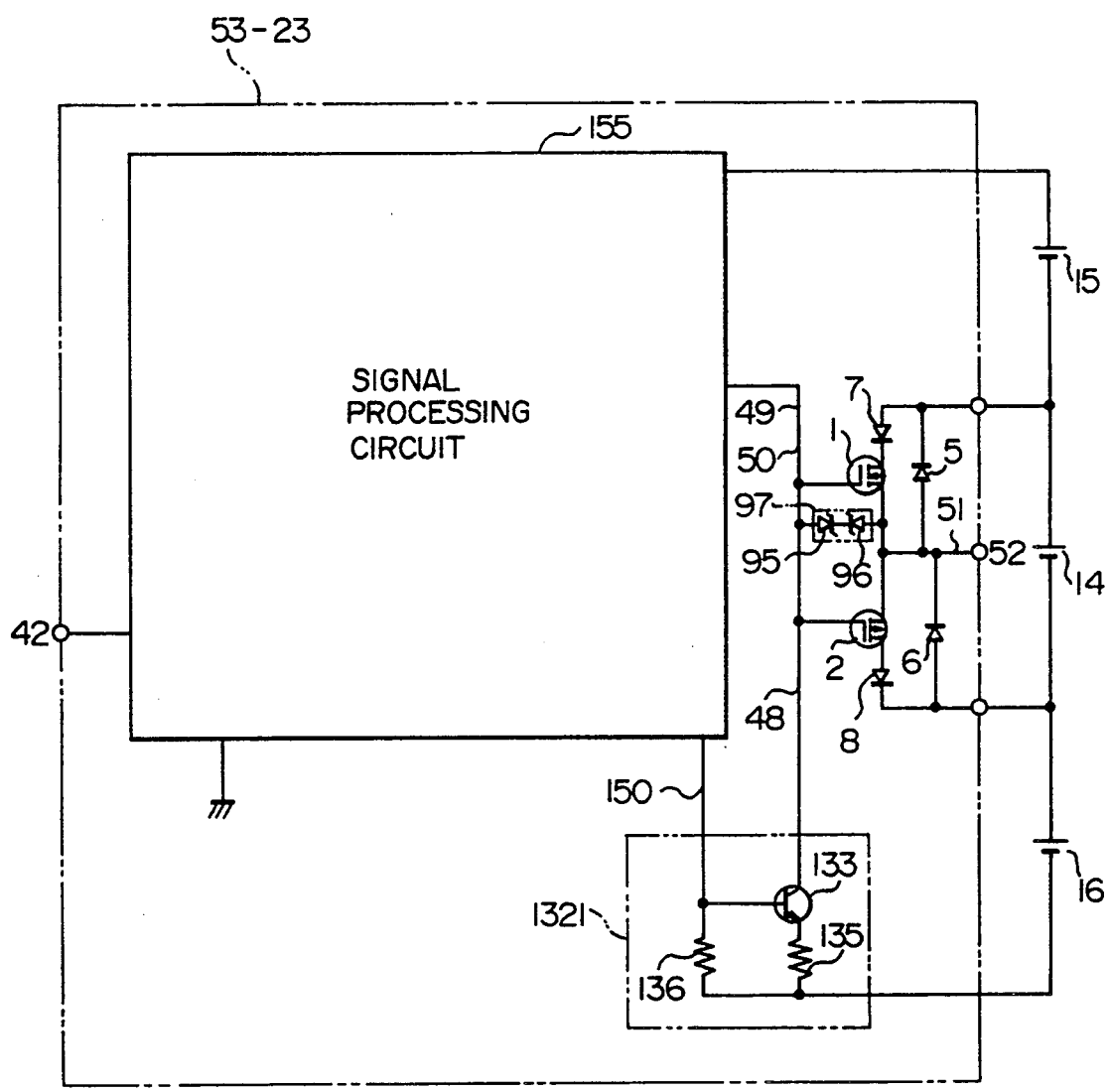
FIG. 27 is a schematic diagram illustrating an output circuit of a PWM inverter according to a twenty-third embodiment of the present invention.

FIG. 27 schematically illustrates a twenty-third embodiment.

The embodiment includes simplified current mirror means 1321 including an NPN transistor 133 and resistors 135 and 136 instead of the current mirror means 132 including the NPN transistors 133 and 134 and the resistors 135 and 136 of FIG. 25. The current mirror means 1321 of FIG. 27 possesses inferior accuracy and temperature characteristics as compared with the current mirror means of FIG. 25 and accordingly is required to increase the voltage of the DC power supply 16, while there is no problem practically as far as the voltage of the DC power supply can be increased.

Embodiment 24

Figure 28:
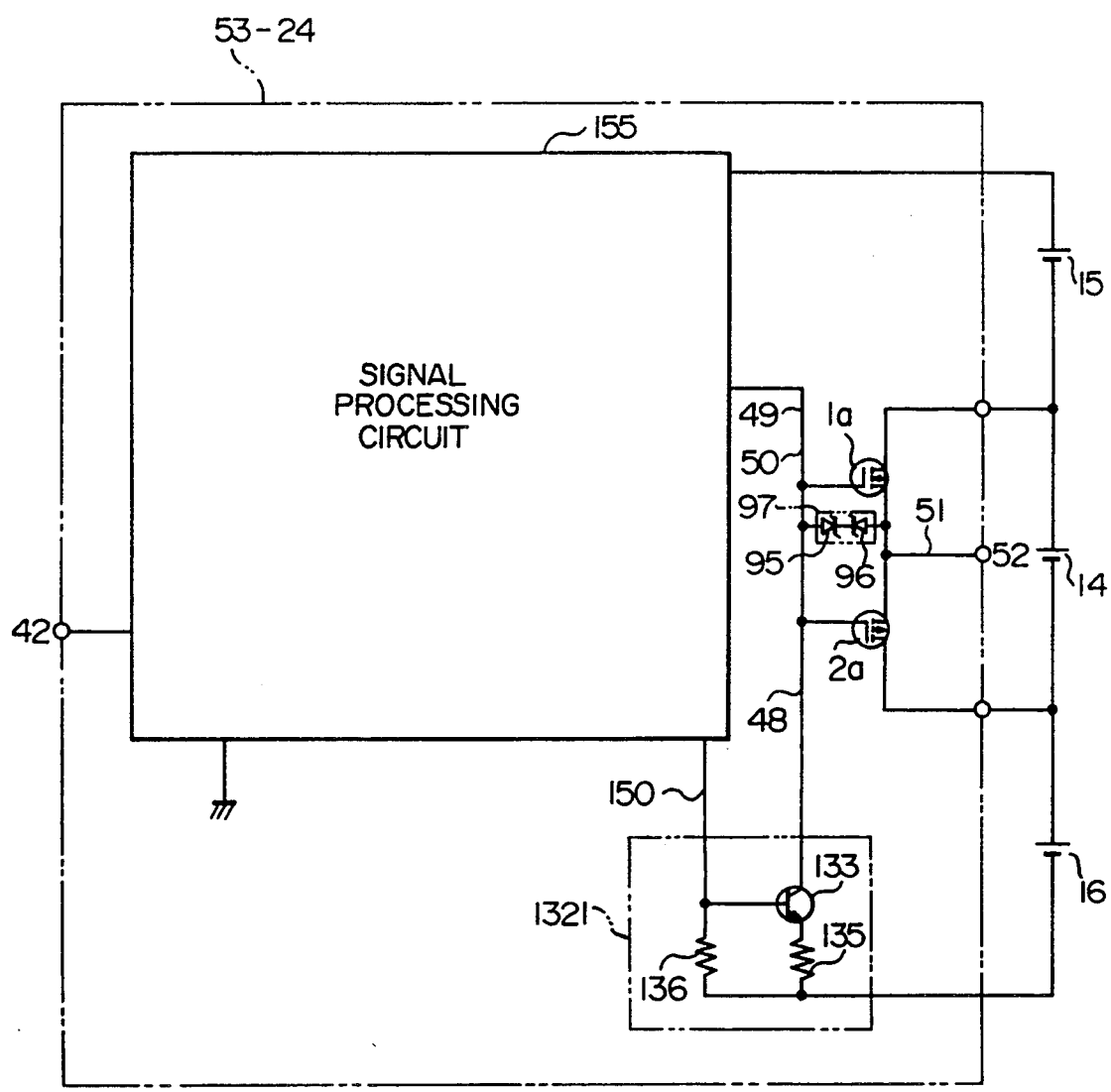
FIG. 28 is a schematic diagram illustrating an output circuit of a PWM inverter according to a twenty-fourth embodiment of the present invention.

FIG. 28 schematically illustrates a twenty-fourth embodiment.

In the embodiment, an N channel power MOS-FET 1a and a P channel power MOS-FET 2a including parasitic diodes having a short reverse recovery time trr are connected instead of the power MOS-FET's 1 and 2 and the diodes 5, 6, 7 and 8 of FIG. 27. Thus, the number of components can be reduced in the same manner as in FIG. 26 and the like.

Embodiment 25

Figure 29:
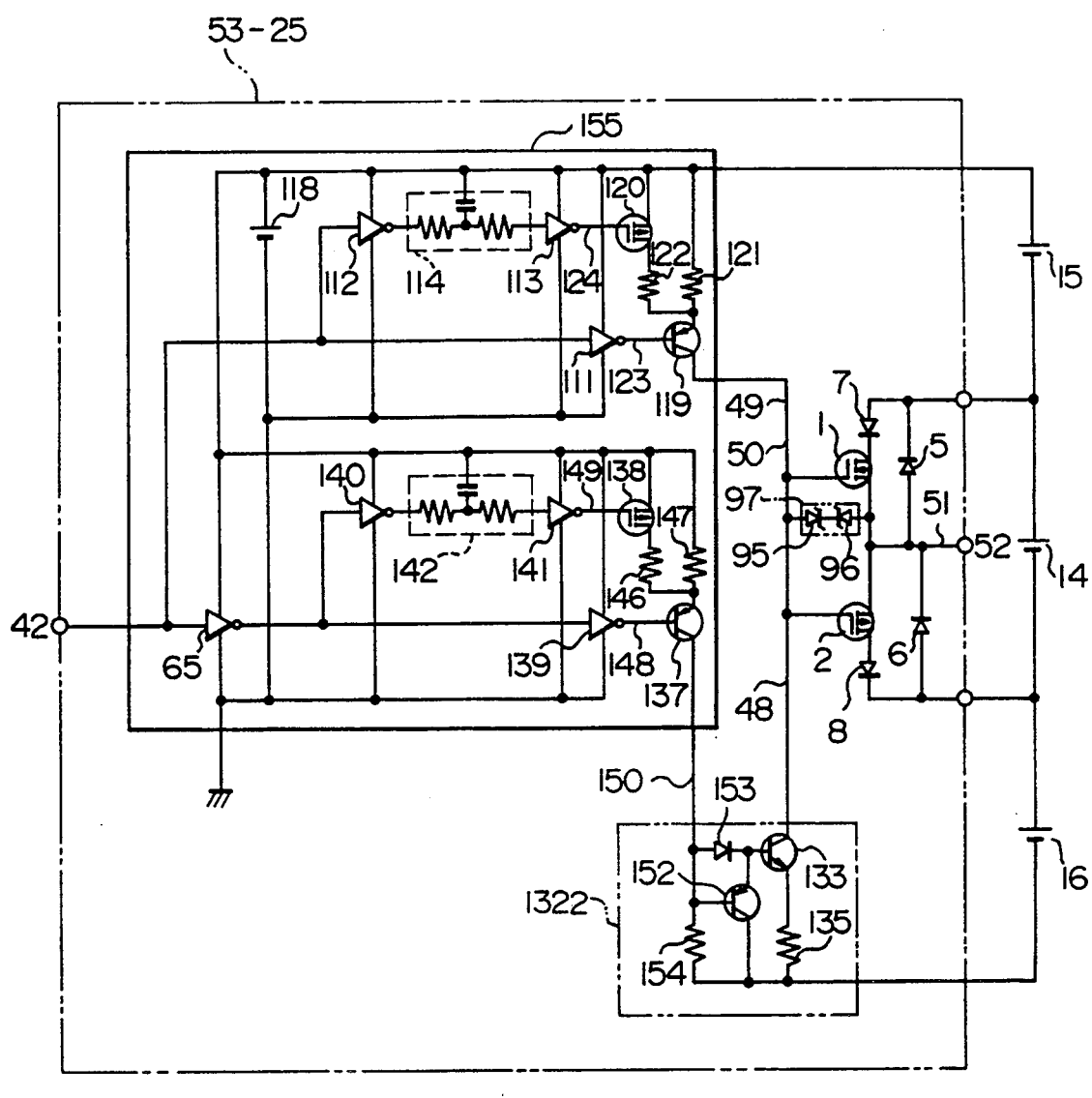
FIG. 29 is a schematic diagram illustrating an output circuit of a PWM inverter according to a twenty-fifth embodiment of the present invention.

FIG. 29 schematically illustrates a twenty-fifth embodiment.

The embodiment includes current mirror means 1322 including an NPN transistor 133, a PNP transistor 152, a diode 153 and resistors 135 and 154 instead of the current mirror means 132 of FIG. 25.

In the current mirror means of FIG. 25, when collector voltage of the NPN transistor 133 is increased, the base voltage of the NPN transistor 133 is increased by the current flowing through the collector output capacitance Cob to thereby turn on the NPN transistor 133. Consequently, a current leaks into the collector of the NPN transistor 133, so that the rising time of the gate signal voltage 50 is lengthened to thereby increase switching loss of the power MOS-FET.

Accordingly, in order to prevent this problem, it is necessary to select the NPN transistor 133 having a very small collector output capacitance Cob.

On the contrary, in the current mirror means 1322 of FIG. 29, when the collector voltage of the NPN transistor 133 is increased, the current flowing through the collector output capacitance Cob can be removed by the emitter current of the NPN transistor 152, so that increase of the base voltage of the NPN transistor 133 can be prevented to thereby reduce the switching loss even if the NPN transistor 133 having a relatively large collector output capacitance Cob is selected.

Embodiment 26

Figure 30A:
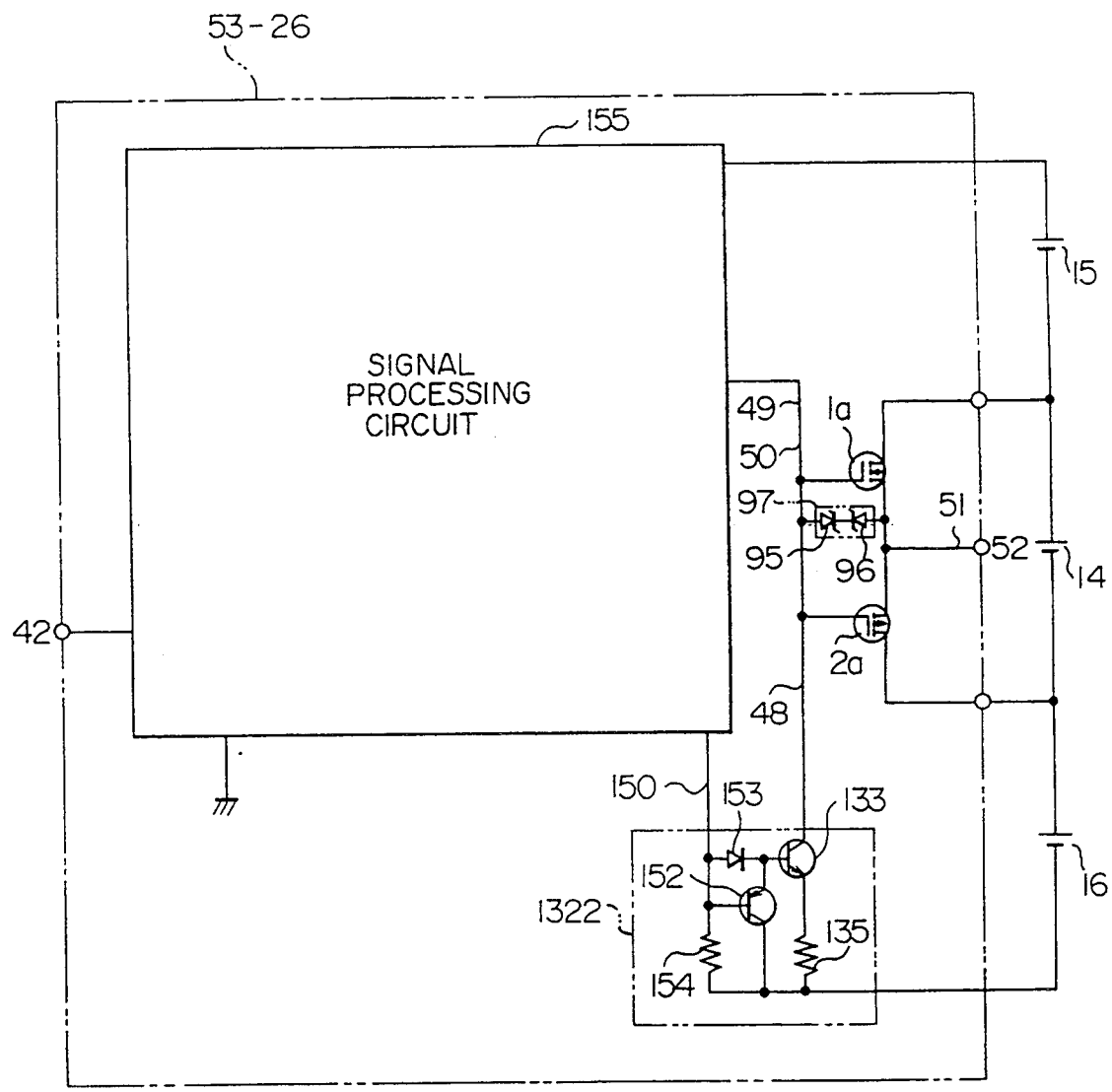
FIG. 30A is a schematic diagram illustrating an output circuit of a PWM inverter according to a twenty-sixth embodiment of the present invention.
Figure 30B:
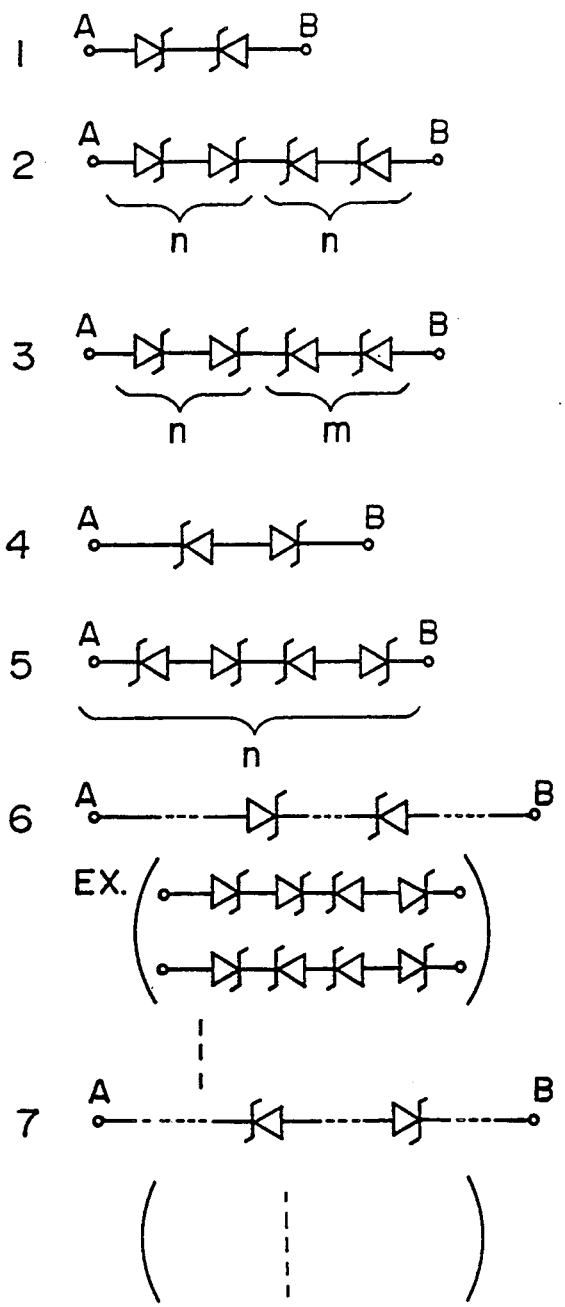
FIG. 30B shows examples of zener diode connection for the voltage limit means able to be used with the present invention.

FIG. 30 schematically illustrates a twenty-sixth embodiment.

In the embodiment, an N channel power MOS-FET 1a and a P channel power MOS-FET 2a including parasitic diodes having a short reverse recovery time trr are connected instead of the power MOS-FET's 1 and 2 and the diodes 5, 6, 7 and 8 of FIG. 29. Thus, the number of components can be reduced in the same manner as in FIG. 28 and the like.

When the three-phase PWM inverter is configured as shown in FIG. 31, the DC main power supply is generally connected in common and three output circuits of the PWM inverter are provided, while in the output circuit of the PWM inverter according to the present invention it is needless to say that the DC power supplies 15 and 16 in the fifteenth to twenty-sixth embodiments can be connected in common.

We claim:

1. An output circuit of a PWM inverter comprising:
   a first power MOS-FET of N channel type, a second power MOS-FET of P channel type, and first, second, third and fourth diodes;
   current control means 1 including a current output terminal and for controlling a current flowing out from said current output terminal;
   current control means 2 including a current input terminal and for controlling a current flowing in from said current input terminal; and
   a DC main power supply;
   said first power MOS-FET having a drain connected to a cathode of said third diode;
   said third diode having an anode connected to a cathode of said first diode and a positive terminal of said DC main power supply;
   said second power MOS-FET having a drain connected to an anode of said fourth diode;
   said fourth diode having a cathode connected to an anode of said second diode and a negative terminal of said DC main power supply;
   said first power MOS-FET having a source connected to an anode of said first diode, a source of said second power MOS-FET and a cathode of said second diode;
   said first power MOS-FET having a gate connected to a gate of said second power MOS-FET, said current output terminal of said current control means 1 and said current input terminal of said current control means 2;

a resistor and voltage limit means having a zener phenomenon for a positive and negative bidirectional voltage being connected in parallel between said gate and source of said first or second power MOS-FET;

said current control means 1 and 2 having:

a first state in which a current flowing out from said current output terminal of said current control means 1 is a first current value and a current flowing in from said current input terminal of said current control means 2 is a seventh current value;

a second state in which a current flowing out from said current output terminal of said current control means 1 is a second current value and a current flowing in from said current input terminal of said current control means 2 is an eighth current value;

a third state in which a current flowing out from said current output terminal of said current control means 1 is a fifth current value and a current flowing in from said current input terminal of said current control means 2 is a third current value;

a fourth state in which a current flowing out from said current output terminal of said current control means 1 is a sixth current value and a current flowing in from said current input terminal of said current control means 2 is a fourth current value; and a fifth state in which a current flowing out from said current output terminal of said current control means 1 is a ninth current value and a current flowing in from said current input terminal of said current control means 2 is also said ninth current value;

said first current value being larger than said seventh current value;

said second current value being larger than said eighth current value;

said third current value being larger than said fifth current value;

said fourth current value being larger than said sixth current value;

a different between said first current value and said seventh current value being larger than a difference between said second current value and said eighth current value;

a difference between said third current value and said fifth current value being larger than a difference between said fourth current value and said sixth current value;

said first state capable of proceeding to only said second and fifth states;

said second state capable of proceeding to only said third and fifth states;

said third state capable of proceeding to only said fourth and fifth states;

said fourth state capable of proceeding to only said first and fifth states; and said fifth state capable of proceeding to at least said first and third states.

2. An output circuit of a PWM inverter according to claim 1, wherein said fifth, sixth, seventh, eighth or ninth current is set to zero.

3. An output circuit of a PWM inverter according to claim 1, wherein said voltage limit means having the zener phenomenon for the positive and negative bidirectional voltage includes two zener diode elements each comprising at least one zener diode connected in series, said two elements being connected in series having respective forward or backward directions of said elements in opposition to each other.

4. An output circuit of a PWM inverter according to claim 1, wherein said voltage limit means having the zener phenomenon for the positive and negative bidirectional voltage comprises more than two zener diode means, each comprising at least one zener diode, connected in series and having the respective forward and backward directions connected alternately.

5. An output circuit of a PWM inverter comprising:

a first power MOS-FET of N channel type and a second power MOS-FET of P channel type;

current control means 1 including a current output terminal and for controlling a current flowing out from said current output terminal;

current control means 2 including a current input terminal and for controlling a current flowing in from said current input terminal; and a DC main power supply;

said first power MOS-FET having a drain connected to a positive terminal of said DC main power supply;

said second power MOS-FET having a drain connected to a negative terminal of said DC main power supply;

said first power MOS-FET having a source connected to a source of said second power MOS-FET, said first power MOS-FET having a gate connected to a gate of said second power MOS-FET, said current output terminal of said current control means 1 and said current input terminal of said current control means 2;

a resistor and voltage limit means having a zener phenomenon for a positive and negative bidirectional voltage being connected in parallel between said gate and source of said first or second power MOS-FET;

said current control means 1 and 2 having:

a first state in which a current flowing out from said current output terminal of said current control means 1 is a first current value and a current flowing in from said current input terminal of said current control means 2 is a seventh current value;

a second state in which a current flowing out from said current output terminal of said current control means 1 is a second current value and a current flowing in from said current input terminal of said current control means 2 is an eighth current value;

a third state in which a current flowing out from said current output terminal of said current control means 1 is a fifth current value and a current flowing in from said current input terminal of said current control means 2 is a third current value;

a fourth state in which a current flowing out from said current output terminal of said current control means 1 is a sixth current value and a current flowing in from said current input terminal of said current control means 2 is a fourth current value; and a fifth state in which a current flowing out from said current output terminal of said current control means 1 is a ninth current value and a current flowing in from said current input terminal of said current control means 2 is also said ninth current value;

said first current value being larger than said seventh current value;

said second current value being larger than said eighth current value;

said third current value being larger than said fifth current value;

said fourth current value being larger than said sixth current value;

a different between said first current value and said seventh current value being larger than a difference between said second current value and said eighth current value;

a difference between said third current value and said fifth current value being larger than a difference between said fourth current value and said sixth current value;

said first state capable of proceeding to only said second and fifth states;

said second state capable of proceeding to only said third and fifth states;

said third state capable of proceeding to only said fourth and fifth states;

said fourth state capable of proceeding to only said first and fifth states; and said fifth state capable of proceeding to at least said first and third states.

6. An output circuit of a PWM inverter comprising:

a first power MOS-FET of N channel type, a second power MOS-FET of P channel type, and first, second, third and fourth diodes;

current mirror means 1 including a current flowing-in terminal and first and second current flowing-out terminals and which functions to flow out from said first current flowing-out terminal a current in association with a current flowing out from said second current flowing-out terminal;

current control means 3 including a current input terminal and for controlling a current flowing in from said current input terminal;

current control means 2 including a current input terminal and for controlling a current flowing in from said current input terminal;

a DC main power supply; and a first DC power supply having a negative terminal connected to a positive terminal of said DC main power supply;

said first power MOS-FET having a drain connected to a cathode of said third diode;

said third diode having an anode connected to a cathode of said first diode and the positive terminal of said DC main power supply;

said second power MOS-FET having a drain connected to an anode of said fourth diode;

said fourth diode having a cathode connected to an anode of said second diode and a negative terminal of said DC main power supply;

said first power MOS-FET having a source connected to an anode of said first diode, a source of said second power MOS-FET and a cathode of said second diode;

said first power MOS-FET having a gate connected to a gate of said second power MOS-FET, said first current flowing-out terminal of said current mirror means 1 and said current input terminal of said current control means 2, said second current flowing-out terminal of said current mirror means 1 being connected to said current input terminal of said current control means 3;

said first DC power supply having a positive terminal connected to said current flowing-in terminal of said current mirror means 1;

a resistor and voltage limit means having a zener phenomenon for a positive and negative bidirectional voltage being connected in parallel between said gate and source of said first or second power MOS-FET;

said current mirror means 1 and said current control means 2 having:

a first state in which a current flowing out from said first current flowing-out terminal of said current mirror means 1 is a first current value and a current flowing in from said current input terminal of said current control means 2 is a seventh current value;

a second state in which a current flowing out from said first current flowing-out terminal of said current mirror means 1 is a second current value and a current flowing in from said current input terminal of said current control means 2 is an eighth current value;

a third state in which a current flowing out from said first current flowing-out terminal of said current mirror means 1 is a fifth current value and a current flowing in from said current input terminal of said current control means 2 is a third current value;

a fourth state in which a current flowing out from said first current flowing-out terminal of said current mirror means 1 is a sixth current value and a current flowing in from said current input terminal of said current control means 2 is a fourth current value; and a fifth state in which a current flowing out from said first current flowing-out terminal of said current mirror means 1 is a ninth current value and a current flowing in from said current input terminal of said current control means 2 is also said ninth current value;

said first current value being larger than said seventh current value;

said second current value being larger than said eighth current value;

said third current value being larger than said fifth current value;

said fourth current value being larger than said sixth current value;

a different between said first current value and said seventh current value being larger than a difference between said second current value and said eighth current value;

a difference between said third current value and said fifth current value being larger than a difference between said fourth current value and said sixth current value;

said first state capable of proceeding to only said second and fifth states;

said second state capable of proceeding to only said third and fifth states;

said third state capable of proceeding to only said fourth and fifth states;

said fourth state capable of proceeding to only said first and fifth states; and said fifth state capable of proceeding to at least said first and third states.

7. An output circuit of a PWM inverter according to claim 6, wherein
said current mirror means 1 includes third and fourth PNP transistors, a collector of said third transistor constituting said first current flowing-out terminal, a junction connected to a base and a collector of said fourth transistor and to a base of said third transistor constituting said second current flowing-out terminal, a junction connected to emitters of said third and fourth transistors through resistors, respectively, constituting said current flowing-in terminal.

8. An output circuit of a PWM inverter according to claim 6, wherein
said current mirror means 1 includes a third PNP transistor, a collector of said third transistor constituting said first current flowing-out terminal, a base of said third transistor constituting said second current flowing-out terminal, a junction connected to the base and an emitter of said third transistor through resistors, respectively, constituting said current flowing-out terminal.

9. An output circuit of a PWM inverter according to claim 6, wherein
said current mirror means 1 includes a third PNP transistor, a fifth NPN transistor, and a fifth diode,
a collector of said third transistor constituting said first current flowing-out terminal,
a junction connected to a base of said fifth transistor and a cathode of said fifth diode constituting said second current flowing-out terminal,
said third transistor having a base connected to an emitter of said fifth transistor and an anode of said fifth diode;
a junction connected through a resistor to a junction connected to the base of said fifth transistor and the cathode of said fifth diode, to an emitter of said third transistor through a resistor, and to a collector of said fifth transistor constituting said current flowing-in terminal.

10. An output circuit of a PWM inverter comprising:
a first power MOS-FET of N channel type and a second power MOS-FET of P channel type;
current mirror means 1 including a current flowing-in terminal and first and second current flowing-out terminals and which functions to flow out from said first current flowing-out terminal a current in association with a current flowing out from said second current flowing-out terminal;
current control means 3 including a current input terminal and for controlling a current flowing in from said current input terminal;
current control means 2 including a current input terminal and for controlling a current flowing in from said current input terminal;
a DC main power supply; and
a first DC power supply having a negative terminal connected to a positive terminal of said DC main power supply;
said first power MOS-FET having a drain connected to the positive terminal of said DC main power supply;
said second power MOS-FET having a drain connected to the negative terminal of said DC main power supply;

said first power MOS-FET having a source connected to a source of said second power MOS-FET, said first power MOS-FET having a gate connected to a gate of said second power MOS-FET, said first current flowing-out terminal of said current mirror means 1 and said current input terminal of said current control means 2, said second current flowing-out terminal of said current mirror means 1 being connected to said current input terminal of said current control means 3;
said first DC power supply having a positive terminal connected to said current flowing-in terminal of said current mirror means 1;
a resistor and voltage limit means having a zener phenomenon for a positive and negative bidirectional voltage being connected in parallel between said gate and source of said first or second power MOS-FET;
said current mirror means 1 and said current control means 2 having:
a first state in which a current flowing out from said first current flowing-out terminal of said current mirror means 1 is a first current value and a current flowing in from said current input terminal of said current control means 2 is a seventh current value;
a second state in which a current flowing out from said first current flowing-out terminal of said current mirror means 1 is a second current value and a current flowing in from said current input terminal of said current control means 2 is an eighth current value;
a third state in which a current flowing out from said first current flowing-out terminal of said current mirror means 1 is a fifth current value and a current flowing in from said current input terminal of said current control means 2 is a third current value;
a fourth state in which a current flowing out from said first current flowing-out terminal of said current mirror means 1 is a sixth current value and a current flowing in from said current input terminal of said current control means 2 is a fourth current value; and
a fifth state in which a current flowing out from said first current flowing-out terminal of said current mirror means 1 is a ninth current value and a current flowing in from said current input terminal of said current control means 2 is also said ninth current value;
said first current value being larger than said seventh current value;
said second current value being larger than said eighth current value;
said third current value being larger than said fifth current value;
said fourth current value being larger than said sixth current value;
a different between said first current value and said seventh current value being larger than a difference between said second current value and said eighth current value;
a difference between said third current value and said fifth current value being larger than a difference between said fourth current value and said sixth current value;
said first state capable of proceeding to only said second and fifth states;

said second state capable of proceeding to only said third and fifth states;

said third state capable of proceeding to only said fourth and fifth states;

said fourth state capable of proceeding to only said first and fifth states; and said fifth state capable of proceeding to at least said first and third states.

11. An output circuit of a PWM inverter according to claim 10, wherein said current mirror means 1 includes third and fourth PNP transistors, a collector of said third transistor constituting said first current flowing-out terminal, a junction connected to a base and a collector of said fourth transistor and to a base of said third transistor constituting said second current flowing-out terminal, a junction connected to emitters of said third and fourth transistors through resistors, respectively, constituting said current flowing-in terminal.

12. An output circuit of a PWM inverter according to claim 10, wherein said current mirror means 1 includes a third PNP transistor, a collector of said third transistor constituting said first current flowing-out terminal, a base of said third transistor constituting said second current flowing-out terminal, a junction connected to the base and an emitter of said third transistor through resistors, respectively, constituting said current flowing-out terminal.

13. An output circuit of a PWM inverter according to claim 10, wherein said current mirror means 1 includes a third PNP transistor, a fifth NPN transistor, and a fifth diode, a collector of said third transistor constituting said first current flowing-out terminal, a junction connected to a base of said fifth transistor and a cathode of said fifth diode constituting said second current flowing-out terminal, said third transistor having a base connected to an emitter of said fifth transistor and an anode of said fifth diode;

a junction connected through a resistor to a junction connected to the base of said fifth transistor and the cathode of said fifth diode, to an emitter of said third transistor through a resistor, and to a collector of said fifth transistor constituting said current flowing-in terminal.

14. An output circuit of a PWM inverter comprising:

a first power MOS-FET of N channel type, a second power MOS-FET of P channel type, and first, second, third and fourth diodes;

current control means 1 including a current output terminal and for controlling a current flowing out from said current output terminal;

current mirror means 2 including a current flowing-out terminal and first and second current flowing-in terminals and which functions to flow in from said first current flowing-in terminal a current in association with a current flowing in from said second current flowing-in terminal;

current control means 4 including a current output terminal and for controlling a current flowing out from said current output terminal;

a DC main power supply; and a second DC power supply having a positive terminal connected to a negative terminal of said DC main power supply;

said first power MOS-FET having a drain connected to a cathode of said third diode;

said third diode having an anode connected to a cathode of said first diode and a positive terminal of said DC main power supply;

said second power MOS-FET having a drain connected to an anode of said fourth diode;

said fourth diode having a cathode connected to an anode of said second diode and the negative terminal of said DC main power supply;

said first power MOS-FET having a source connected to an anode of said first diode, a source of said second power MOS-FET and a cathode of said second diode;

said first power MOS-FET having a gate connected to a gate of said second power MOS-FET, said current output terminal of said current control means 1 and said first current flowing-in terminal of said current mirror means 2, said current output terminal of said current control means 4 being connected to said second current flowing-in terminal of said current mirror means 2;

said second DC power supply having a negative terminal connected to said current flowing-out terminal of said current mirror means 2;

a resistor and voltage limit means having a zener phenomenon for a positive and negative bidirectional voltage being connected in parallel between said gate and source of said first or second power MOS-FET;

said current control means 1 and said current mirror means 2 having:

a first state in which a current flowing out from said current output terminal of said current control means 1 is a first current value and a current flowing in from said first current flowing-in terminal of said current mirror means 2 is a seventh current value;

a second state in which a current flowing out from said current output terminal of said current control means 1 is a second current value and a current flowing in from said first current flowing-in terminal of said current mirror means 2 is an eighth current value;

a third state in which a current flowing out from said current output terminal of said current control means 1 is a fifth current value and a current flowing in from said first current flowing-in terminal of said current mirror means 2 is a third current value;

a fourth state in which a current flowing out from said current output terminal of said current control means 1 is a sixth current value and a current flowing in from said first current flowing-in terminal of said current mirror means 2 is a fourth current value; and a fifth state in which a current flowing out from said current output terminal of said current control means 1 is a ninth current value and a current flowing in from said first current flowing-in terminal of said current mirror means 2 is also said ninth current value;

said first current value being larger than said seventh current value;

said second current value being larger than said eighth current value;

said third current value being larger than said fifth current value;

said fourth current value being larger than said sixth current value;

a different between said first current value and said seventh current value being larger than a difference between said second current value and said eighth current value;

a difference between said third current value and said fifth current value being larger than a difference between said fourth current value and said sixth current value;

said first state capable of proceeding to only said second and fifth states;

said second state capable of proceeding to only said third and fifth states;

said third state capable of proceeding to only said fourth and fifth states;

said fourth state capable of proceeding to only said first and fifth states; and said fifth state capable of proceeding to at least said first and third states.

15. An output circuit of a PWM inverter according to claim 14, wherein said current mirror means 2 includes sixth and seventh NPN transistors, a collector of said sixth transistor constituting said first current flowing-in terminal, a junction connected to a base and a collector of said seventh transistor and to a base of said sixth transistor constituting said second current flowing-in terminal, a junction connected to emitters of said sixth and seventh transistors through resistors, respectively, constituting said current flowing-out terminal.

16. An output circuit of a PWM inverter according to claim 14, wherein said current mirror means 2 includes a sixth NPN transistor, a collector of said sixth transistor constituting said first current flowing-in terminal, a base of said sixth transistor constituting said second current flowing-in terminal, a junction connected to the base and an emitter of said sixth transistor through resistors, respectively, constituting said current flowing-out terminal.

17. An output circuit of a PWM inverter according to claim 14, wherein said current mirror means 2 includes a sixth NPN transistor, an eighth PNP transistor, and a sixth diode, a collector of said sixth transistor constituting said first current flowing-in terminal, a junction connected to a base of said eighth transistor and an anode of said sixth diode constituting said second current flowing-in terminal, said sixth transistor having a base connected to an emitter of said eighth transistor and a cathode of said sixth diode;

a junction connected to a junction connected through a resistor to the base of said eighth transistor and the anode of said sixth diode, to an emitter of said sixth transistor through a resistor and to a collector of said eighth transistor constituting said current flowing-out terminal.

18. An output circuit of a PWM inverter comprising:
a first power MOS-FET of N channel type and a second power MOS-FET of P channel type;
current control means 1 including a current output terminal and for controlling a current flowing out from said current output terminal;

current mirror means 2 including a current flowing-out terminal and first and second current flowing-in terminals and which functions to flow in a current corresponding to a current flowing in from said second current flowing-in terminal, from said first current flowing-in terminal;

current control means 4 including a current output terminal and for controlling a current flowing out from said current output terminal;

a DC main power supply; and a second DC power supply having a positive terminal connected to a negative terminal of said DC main power supply;

said first power MOS-FET having a drain connected to a positive terminal of said DC main power supply;

said second power MOS-FET having a drain connected to the negative terminal of said DC main power supply;

said first power MOS-FET having a source connected to a source of said second power MOS-FET, a gate of said first power MOS-FET being connected to a gate of said second power MOS-FET, said current output terminal of said current control means 1 and said first current flowing-in terminal of said current mirror means 2, said current output terminal of said current mirror means 4 being connected to said second current flowing-in terminal of said current mirror means 2;

said second DC power supply having a negative terminal connected to said current flowing-out terminal of said current mirror means 2;

a resistor and voltage limit means having a zener phenomenon for a positive and negative bidirectional voltage being connected in parallel between said gate and source of said first or second power MOS-FET;

said current control means 1 and said current mirror means 2 having:

a first state in which a current flowing out from said current output terminal of said current control means 1 is a first current value and a current flowing in from said first current flowing-in terminal of said current mirror means 2 is a seventh current value;

a second state in which a current flowing out from said current output terminal of said current control means 1 is a second current value and a current flowing in from said first current flowing-in terminal of said current mirror means 2 is an eighth current value;

a third state in which a current flowing out from said current output terminal of said current control means 1 is a fifth current value and a current flowing in from said first current flowing-in terminal of said current mirror means 2 is a third current value;

a fourth state in which a current flowing out from said current output terminal of said current control means 1 is a sixth current value and a current flowing in from said first current flowing-in terminal of said current mirror means 2 is a fourth current value; and a fifth state in which a current flowing out from said current output terminal of said current control means 1 is a ninth current value and a current flowing in from said first current flowing-in terminal of said current mirror means 2 is also said ninth current value;

said first current value being larger than said seventh current value;

said second current value being larger than said eighth current value;

said third current value being larger than said fifth current value;

said fourth current value being larger than said sixth current value;

a different between said first current value and said seventh current value being larger than a difference between said second current value and said eighth current value;

a difference between said third current value and said fifth current value being larger than a difference between said fourth current value and said sixth current value;

said first state capable of proceeding to only said second and fifth states;

said second state capable of proceeding to only said third and fifth states;

said third state capable of proceeding to only said fourth and fifth states;

said fourth state capable of proceeding to only said first and fifth states; and said fifth state capable of proceeding to at least said first and third states.

19. An output circuit of a PWM inverter according to claim 18, wherein said current mirror means 2 includes sixth and seventh NPN transistors, a collector of said sixth transistor constituting said first current flowing-in terminal, a junction connected to a base and a collector of said seventh transistor and to a base of said sixth transistor constituting said second current flowing-in terminal, a junction connected to emitters of said sixth and seventh transistors through resistors, respectively, constituting said current flowing-out terminal.

20. An output circuit of a PWM inverter according to claim 18, wherein said current mirror means 2 includes a sixth NPN transistor, a collector of said sixth transistor constituting said first current flowing-in terminal, a base of said sixth transistor constituting said second current flowing-in terminal, a junction connected to the base and an emitter of said sixth transistor through resistors, respectively, constituting said current flowing-out terminal.

21. An output circuit of a PWM inverter according to claim 18, wherein said current mirror means 2 includes a sixth NPN transistor, an eighth PNP transistor, and a sixth diode, a collector of said sixth transistor constituting said first current flowing-in terminal, a junction connected to a base of said eighth transistor and an anode of said sixth diode constituting said second current flowing-in terminal, said sixth transistor having a base connected to an emitter of said eighth transistor and a cathode of said sixth diode;

a junction connected to a junction connected through a resistor to the base of said eighth transistor and the anode of said sixth diode, to an emitter of said sixth transistor through a resistor and to a collector of said eighth transistor constituting said current flowing-out terminal.

22. An output circuit of a PWM inverter according to claim 21, wherein said fifth, sixth, seventh, eighth or ninth current is set to zero.

23. An output circuit of a PWM inverter according to claim 22, wherein said voltage limit means having the zener phenomenon for the positive and negative bidirectional voltage includes two zener diode elements each comprising at least one zener diode connected in series, said two elements being connected in series having respective forward or backward directions of said elements in opposition to each other.

24. An output circuit of a PWM inverter according to claim 22, wherein said voltage limit means having the zener phenomenon for the positive and negative bidirectional voltage comprises more than two zener diode means, each comprising at least one zener diode, connected in series and having the respective forward and backward directions connected alternately.

* * * * *